(12) United States Patent
Saari et al.

(10) Patent No.: US 12,474,509 B2
(45) Date of Patent: Nov. 18, 2025

(54) LIGHT FIELD IMAGING DEVICE AND METHOD FOR DEPTH ACQUISITION AND THREE-DIMENSIONAL IMAGING

(71) Applicant: AIRY3D INC., Montreal (CA)

(72) Inventors: Jonathan Ikola Saari, Halifax (CA); Ji-Ho Cho, Montreal (CA)

(73) Assignee: Airy3D Inc., Montreal (CA)

( * ) Notice: Subject to any disclaimer, the term of this patent is extended or adjusted under 35 U.S.C. 154(b) by 415 days.

(21) Appl. No.: 17/397,019

(22) Filed: Aug. 9, 2021

(65) Prior Publication Data

US 2022/0057550 A1 Feb. 24, 2022

Related U.S. Application Data

(63) Continuation of application No. 16/308,173, filed as application No. PCT/CA2017/050686 on Jun. 6, 2017, now abandoned.

(Continued)

(51) Int. Cl.
*G02B 5/18* (2006.01)
*G02B 3/00* (2006.01)
(Continued)

(52) U.S. Cl.
CPC ......... *G02B 5/1842* (2013.01); *G02B 3/0006* (2013.01); *G02B 5/1814* (2013.01);
(Continued)

(58) Field of Classification Search
CPC .. G02B 5/1814; G02B 5/1819; G02B 5/1809; G02B 5/201; G02B 5/1842; G02B 5/1861; G02B 5/1876; G02B 5/1871
See application file for complete search history.

(56) References Cited

U.S. PATENT DOCUMENTS 3,641,895 A * 2/1972 Bestenreiner .......... G03B 33/10
359/619
3,756,695 A 9/1973 Mino
(Continued)

FOREIGN PATENT DOCUMENTS

JP 2009-025501 A 2/2009
JP 4978105 7/2012
(Continued)

OTHER PUBLICATIONS

Communication from the European Patent Office for corresponding European application No. 17809494.2, dated Mar. 25, 2022.
(Continued)

*Primary Examiner* — Sophia T Nguyen
(74) *Attorney, Agent, or Firm* — McDonnell Boehnen Hulbert & Berghoff LLP

(57) ABSTRACT

A light field imaging device and method are provided. The device can include a diffraction grating assembly receiving a wavefront from a scene and including one or more diffraction gratings, each having a grating period along a grating axis and diffracting the wavefront to generate a diffracted wavefront. The device can also include a pixel array disposed under the diffraction grating assembly and detecting the diffracted wavefront in a near-field diffraction regime to provide light field image data about the scene. The pixel array has a pixel pitch along the grating axis that is smaller than the grating period. The device can further include a color filter array disposed over the pixel array to spatio-chromatically sample the diffracted wavefront prior to detection by the pixel array. The device and method can be implemented in backside-illuminated sensor architectures. Diffraction grating assemblies for use in the device and method are also disclosed.

10 Claims, 22 Drawing Sheets

Related U.S. Application Data

(60) Provisional application No. 62/346,884, filed on Jun. 7, 2016.

(51) Int. Cl.
| | | |
|---|---|---|
| *G02B 5/20* | (2006.01) | |
| *G02B 27/00* | (2006.01) | |
| *G02B 27/42* | (2006.01) | |
| *G02B 27/46* | (2006.01) | |
| *G03B 11/00* | (2021.01) | |
| *G03B 33/00* | (2006.01) | |
| *G03B 35/08* | (2021.01) | |
| *H04N 13/20* | (2018.01) | |
| *H04N 13/207* | (2018.01) | |
| *H04N 13/232* | (2018.01) | |
| *H04N 13/257* | (2018.01) | |
| *H04N 23/957* | (2023.01) | |
| *H04N 25/13* | (2023.01) | |
| *H10F 39/00* | (2025.01) | |
| *H10F 39/12* | (2025.01) | |
| *H10F 39/18* | (2025.01) | |

(52) U.S. Cl.
CPC ............ *G02B 5/1871* (2013.01); *G02B 5/201* (2013.01); *G02B 27/0075* (2013.01); *G02B 27/4205* (2013.01); *G02B 27/46* (2013.01); *G03B 11/00* (2013.01); *G03B 35/08* (2013.01); *H04N 13/20* (2018.05); *H04N 13/207* (2018.05); *H04N 13/232* (2018.05); *H04N 13/257* (2018.05); *H04N 23/957* (2023.01); *H04N 25/13* (2023.01); *H10F 39/182* (2025.01); *H10F 39/199* (2025.01); *H10F 39/8027* (2025.01); *H10F 39/8053* (2025.01); *H10F 39/806* (2025.01); *H10F 39/8063* (2025.01); *G03B 33/00* (2013.01)

(56) References Cited

U.S. PATENT DOCUMENTS

| | | | |
|---|---|---|---|
| 3,910,683 A | 10/1975 | Nishino | |
| 3,940,788 A | 2/1976 | Abe | |
| 4,105,289 A | 8/1978 | Hershel | |
| 4,255,019 A | 3/1981 | Knop | |
| 4,729,641 A | 3/1988 | Matsuoka | |
| 4,998,800 A | 3/1991 | Nishida | |
| 5,007,708 A | 4/1991 | Gaylord | |
| 5,046,827 A | 9/1991 | Frost | |
| 5,225,920 A | 7/1993 | Kasazumi | |
| 5,237,452 A | 8/1993 | Okayama | |
| 5,467,224 A | 11/1995 | Ohnishi | |
| 5,513,025 A * | 4/1996 | Watanabe | G02B 27/4244 |
| | | | 359/569 |
| 5,513,289 A | 4/1996 | Hosokawa | |
| 5,621,487 A | 4/1997 | Shirochi | |
| 5,627,847 A | 5/1997 | Leger | |
| 5,682,265 A | 10/1997 | Farn | |
| 6,040,857 A | 3/2000 | Hirsh | |
| 6,081,354 A | 6/2000 | Gambogi, Jr. | |
| 6,101,034 A | 8/2000 | Cox | |
| 6,219,015 B1 | 4/2001 | Bloom | |
| 6,310,724 B1 | 10/2001 | Shirochi | |
| 6,363,169 B1 * | 3/2002 | Ritter | G06T 17/10 |
| | | | 382/154 |
| 6,473,144 B1 | 10/2002 | Ichikawa | |
| 6,738,171 B1 | 5/2004 | Campbell | |
| 6,819,361 B1 | 11/2004 | Lee | |
| 6,981,773 B2 | 1/2006 | Kamijima | |
| 6,999,235 B2 | 2/2006 | Nakamura | |
| 7,113,341 B2 | 9/2006 | Kamijima | |
| 7,114,820 B1 | 10/2006 | Parikka | |
| 7,133,204 B2 | 11/2006 | Urey | |
| 7,253,799 B2 | 8/2007 | Lee | |
| 7,423,796 B2 | 9/2008 | Woodgate | |
| 7,548,359 B2 * | 6/2009 | Murakami | G11B 7/123 |
| | | | 369/44.37 |
| 7,663,084 B2 * | 2/2010 | Toshikiyo | H01L 27/14685 |
| | | | 359/569 |
| 7,719,767 B2 | 5/2010 | Lin | |
| 7,965,936 B2 * | 6/2011 | Raskar | G02B 27/0075 |
| | | | 396/89 |
| 8,189,260 B2 | 5/2012 | Lin | |
| 8,199,231 B2 | 6/2012 | Takamiya | |
| 8,514,352 B2 | 8/2013 | Montgomery | |
| 8,530,811 B2 | 9/2013 | Molnar | |
| 8,680,591 B2 | 3/2014 | Haddad | |
| 8,736,787 B2 | 5/2014 | Li | |
| 8,767,047 B2 * | 7/2014 | Molnar | H01L 27/14607 |
| | | | 348/43 |
| 8,792,027 B2 | 7/2014 | Yamagata | |
| 8,809,758 B2 * | 8/2014 | Molnar | H01L 27/14685 |
| | | | 250/237 G |
| 8,823,067 B2 | 9/2014 | Iwasaki | |
| 8,963,808 B2 | 2/2015 | Gollier | |
| 8,988,317 B1 * | 3/2015 | Liang | H04N 13/232 |
| | | | 345/32 |
| 9,031,343 B2 * | 5/2015 | Venkataraman | G06T 7/50 |
| | | | 382/250 |
| 9,042,667 B2 * | 5/2015 | Venkataraman | H04N 13/271 |
| | | | 382/233 |
| 9,203,054 B2 | 12/2015 | Hirasawa | |
| 9,515,113 B2 | 12/2016 | Gill | |
| 9,819,846 B2 | 11/2017 | Masuda | |
| 9,837,455 B2 * | 12/2017 | Lin | H01L 27/14621 |
| 9,851,579 B2 | 12/2017 | Inada | |
| 10,267,961 B2 * | 4/2019 | Wang | G02B 5/1871 |
| 10,317,589 B2 | 6/2019 | Ueda | |
| 10,319,760 B2 | 6/2019 | Lin | |
| 10,429,660 B2 | 10/2019 | Chen | |
| 10,437,327 B2 * | 10/2019 | Sengelaub | G06V 40/193 |
| 10,481,328 B1 | 11/2019 | Krueger | |
| 10,605,916 B2 * | 3/2020 | Molnar | G01S 7/4816 |
| 11,438,571 B2 * | 9/2022 | Saari | H04N 13/207 |
| 11,683,598 B1 * | 6/2023 | Mu | H04N 23/951 |
| | | | 348/207.99 |
| 2002/0171842 A1 * | 11/2002 | Dicarlo | G06V 10/60 |
| | | | 356/445 |
| 2003/0044729 A1 * | 3/2003 | Huang | H01L 27/14627 |
| | | | 430/321 |
| 2003/0067460 A1 * | 4/2003 | Tomono | H04N 13/305 |
| | | | 348/E13.043 |
| 2003/0187610 A1 * | 10/2003 | Dorrance | G01B 11/2755 |
| | | | 702/151 |
| 2004/0032659 A1 * | 2/2004 | Drinkwater | B42D 25/328 |
| | | | 359/558 |
| 2005/0134712 A1 * | 6/2005 | Gruhlke | H04N 23/15 |
| | | | 348/E9.01 |
| 2005/0260349 A1 | 11/2005 | Pawlowski | |
| 2006/0055794 A1 * | 3/2006 | Sato | H04N 23/843 |
| | | | 348/222.1 |
| 2006/0072005 A1 * | 4/2006 | Thomas-Wayne | H04N 13/20 |
| | | | 348/E13.041 |
| 2006/0209292 A1 | 9/2006 | Dowski | |
| 2006/0262250 A1 * | 11/2006 | Hobbs | G02B 5/3058 |
| | | | 349/96 |
| 2007/0047221 A1 | 3/2007 | Park | |
| 2007/0081246 A1 * | 4/2007 | Stuck | G02B 5/1861 |
| | | | 359/568 |
| 2007/0229955 A1 * | 10/2007 | Kawamura | G02B 5/1809 |
| | | | 359/569 |
| 2007/0279731 A1 * | 12/2007 | Blumberg | G02B 26/0833 |
| | | | 359/291 |
| 2007/0298533 A1 * | 12/2007 | Yang | H01L 27/14625 |
| | | | 438/57 |
| 2008/0043166 A1 * | 2/2008 | Liu | G02F 1/133371 |
| | | | 349/56 |
| 2008/0062290 A1 * | 3/2008 | Lahav | H04N 25/778 |
| | | | 348/E9.01 |

(56) References Cited

U.S. PATENT DOCUMENTS

| | | | |
|---|---|---|---|
| 2008/0138013 A1* | 6/2008 | Parriaux | G02B 5/32 385/37 |
| 2008/0169479 A1* | 7/2008 | Xu | H01L 33/20 257/E33.068 |
| 2008/0186491 A1 | 8/2008 | Baxter | |
| 2008/0259434 A1* | 10/2008 | Nagayama | G03H 1/08 347/43 |
| 2009/0122229 A1 | 5/2009 | Kim | |
| 2009/0180115 A1 | 7/2009 | Wilson | |
| 2009/0180180 A1 | 7/2009 | Shimshi | |
| 2009/0231711 A1* | 9/2009 | Ohmura | H04N 25/61 359/569 |
| 2010/0084692 A1* | 4/2010 | Mao | H01L 27/1463 257/E31.127 |
| 2010/0085642 A1* | 4/2010 | Drinkwater | G02B 5/1861 359/572 |
| 2010/0118172 A1 | 5/2010 | McCarten | |
| 2010/0165134 A1* | 7/2010 | Dowski, Jr. | G02B 13/0085 257/E31.127 |
| 2010/0243869 A1 | 9/2010 | Wano | |
| 2010/0244168 A1 | 9/2010 | Shiozawa | |
| 2011/0134294 A1 | 6/2011 | Ernst | |
| 2011/0141244 A1* | 6/2011 | Vos | G02B 3/0006 348/51 |
| 2011/0192962 A1 | 8/2011 | Nishiwaki | |
| 2011/0266441 A1 | 11/2011 | Fagan | |
| 2012/0008056 A1 | 1/2012 | Gong | |
| 2012/0013654 A1 | 1/2012 | Yashiro | |
| 2012/0091372 A1* | 4/2012 | Molnar | H01L 27/14625 257/E31.127 |
| 2012/0162771 A1* | 6/2012 | Walter | G02B 5/1809 359/569 |
| 2012/0193515 A1* | 8/2012 | Agranov | H04N 13/204 250/214 P |
| 2013/0162636 A1* | 6/2013 | Kida | G06T 15/005 345/419 |
| 2013/0195353 A1* | 8/2013 | Uslubas | H04N 1/628 382/167 |
| 2013/0222552 A1* | 8/2013 | Agranov | H04N 13/204 348/49 |
| 2013/0235460 A1 | 9/2013 | Iwasa et al. | |
| 2013/0243337 A1* | 9/2013 | Hwang | G06V 20/64 382/201 |
| 2013/0265459 A1* | 10/2013 | Duparre | G02B 3/0068 348/218.1 |
| 2013/0278726 A1* | 10/2013 | Muhammad | H04N 25/611 348/46 |
| 2013/0299685 A1 | 11/2013 | Nishiwaki | |
| 2014/0028878 A1* | 1/2014 | S. V. | G06T 3/4038 382/284 |
| 2014/0146207 A1 | 5/2014 | Yokogawa | |
| 2014/0253781 A1* | 9/2014 | Gill | G02B 5/1842 359/569 |
| 2014/0264686 A1* | 9/2014 | Tu | H01L 27/14621 257/432 |
| 2014/0300711 A1* | 10/2014 | Kroon | H04N 13/307 348/51 |
| 2014/0313368 A1 | 10/2014 | Tanaka | |
| 2014/0327783 A1* | 11/2014 | Nishiwaki | H01L 27/14649 257/432 |
| 2014/0334745 A1* | 11/2014 | Fleischer | G02B 27/0075 382/284 |
| 2015/0042858 A1* | 2/2015 | Kokubun | H01L 27/14629 348/302 |
| 2015/0061065 A1* | 3/2015 | Gill | H01L 27/14627 257/432 |
| 2015/0070536 A1 | 3/2015 | Sasaki | |
| 2015/0125943 A1* | 5/2015 | Molnar | G01B 11/14 356/614 |
| 2015/0138402 A1* | 5/2015 | Ng | G02B 7/282 348/240.3 |
| 2015/0138527 A1 | 5/2015 | Hiramto et al. | |
| 2015/0181091 A1* | 6/2015 | Myhre | H04N 25/61 348/345 |
| 2015/0201176 A1* | 7/2015 | Graziosi | H04N 19/436 348/43 |
| 2015/0264335 A1* | 9/2015 | Park | G02B 7/38 348/49 |
| 2015/0293018 A1* | 10/2015 | Stork | G02B 5/1871 250/550 |
| 2015/0371434 A1 | 12/2015 | Nash | |
| 2016/0003994 A1 | 1/2016 | Gill | |
| 2016/0033696 A1* | 2/2016 | Gill | H04N 23/815 348/335 |
| 2016/0062100 A1 | 3/2016 | Cohen | |
| 2016/0065870 A1* | 3/2016 | Pyeoun | H01L 27/14629 348/302 |
| 2016/0088265 A1 | 3/2016 | Lu | |
| 2016/0126275 A1 | 5/2016 | Kurokawa | |
| 2016/0131808 A1* | 5/2016 | Kristensen | G02B 1/005 359/884 |
| 2016/0133762 A1 | 5/2016 | Balsco Claret | |
| 2016/0141321 A1* | 5/2016 | Hsieh | H01L 27/14629 250/216 |
| 2016/0182889 A1* | 6/2016 | Olmstead | H04N 19/17 348/47 |
| 2016/0187664 A1 | 6/2016 | Chen | |
| 2016/0225922 A1 | 8/2016 | Akkaya | |
| 2016/0255289 A1* | 9/2016 | Johnson | H04N 25/585 348/273 |
| 2016/0309065 A1* | 10/2016 | Karafin | H04N 23/45 |
| 2016/0323566 A1* | 11/2016 | Vdovin | G02B 30/27 |
| 2016/0337607 A1 | 11/2016 | Okamoto | |
| 2016/0351610 A1* | 12/2016 | Chen | H01L 27/14623 |
| 2016/0371845 A1* | 12/2016 | Yasovsky | G02B 27/4205 |
| 2017/0048500 A1* | 2/2017 | Shi | H04N 9/646 |
| 2017/0060242 A1* | 3/2017 | Gill | G02B 5/1871 |
| 2017/0084046 A1 | 3/2017 | Gill | |
| 2017/0085832 A1* | 3/2017 | Drazic | H04N 5/9201 |
| 2017/0094260 A1* | 3/2017 | Agranov | H04N 13/286 |
| 2017/0097515 A1* | 4/2017 | Bell | H04N 13/395 |
| 2017/0112376 A1* | 4/2017 | Gill | G02B 5/1871 |
| 2017/0115436 A1 | 4/2017 | Qian | |
| 2017/0160133 A1* | 6/2017 | Lin | G02B 5/1828 |
| 2017/0171470 A1 | 6/2017 | Sakioka | |
| 2017/0199420 A1* | 7/2017 | Shin | G02B 30/33 |
| 2017/0207258 A1* | 7/2017 | Lin | H01L 27/14621 |
| 2017/0229503 A1 | 8/2017 | Suzuki | |
| 2017/0248796 A1* | 8/2017 | Banks | G01S 17/894 |
| 2017/0300011 A1* | 10/2017 | Gill | G03H 1/0443 |
| 2017/0355637 A1* | 12/2017 | Nomura | C03C 4/085 |
| 2017/0373105 A1 | 12/2017 | Galor Gluskin | |
| 2018/0011237 A1 | 1/2018 | Fattal | |
| 2018/0020157 A1 | 1/2018 | Gill | |
| 2018/0091798 A1* | 3/2018 | Chang | G06T 7/593 |
| 2018/0149796 A1 | 5/2018 | Xu | |
| 2018/0260969 A1* | 9/2018 | Boisson | H04N 23/00 |
| 2018/0350856 A1 | 12/2018 | Masagaki | |
| 2019/0018186 A1* | 1/2019 | Fattal | G02F 1/1336 |
| 2019/0033448 A1* | 1/2019 | Molnar | G01S 17/46 |
| 2019/0049235 A1* | 2/2019 | Han | G02B 5/1842 |
| 2019/0086698 A1 | 3/2019 | Mizusaki | |
| 2019/0114794 A1* | 4/2019 | Wang | G06T 7/521 |
| 2019/0132574 A1* | 5/2019 | Price | G01B 11/2518 |
| 2019/0222821 A1* | 7/2019 | Graziosi | H04N 13/271 |
| 2019/0227151 A1* | 7/2019 | Bikumandla | G02B 27/0087 |
| 2019/0246091 A1 | 8/2019 | Bikumandla | |
| 2019/0257987 A1* | 8/2019 | Saari | H04N 13/207 |
| 2019/0339485 A1 | 11/2019 | Nakamura | |
| 2019/0346598 A1* | 11/2019 | Gill | G02B 5/1866 |
| 2019/0348452 A1* | 11/2019 | Ootsuka | H01L 27/14685 |
| 2020/0075656 A1* | 3/2020 | Lee | H01L 27/14643 |
| 2020/0099921 A1* | 3/2020 | Hicks | H04N 13/271 |
| 2020/0150489 A1 | 5/2020 | Ma | |
| 2020/0201111 A1* | 6/2020 | Williams | G02B 5/1876 |
| 2020/0280659 A1* | 9/2020 | Galor Gluskin | H04N 25/533 |
| 2020/0359004 A1* | 11/2020 | Saari | H04N 13/207 |
| 2021/0082990 A1* | 3/2021 | Zhao | H01L 27/14603 |
| 2021/0382215 A1* | 12/2021 | Kawashita | H01L 33/60 |
| 2022/0057550 A1* | 2/2022 | Saari | G03B 11/00 |

(56) References Cited

U.S. PATENT DOCUMENTS

| | | | | |
|---|---|---|---|---|
| 2022/0221733 A1* | 7/2022 | Saari | ............... | G02B 5/1866 |
| 2022/0222912 A1* | 7/2022 | Hanada | ............... | H04N 25/13 |
| 2023/0418084 A1* | 12/2023 | Kunnath | ............ | G02B 27/4205 |

FOREIGN PATENT DOCUMENTS

| | | |
|---|---|---|
| JP | 2014-154755 A | 8/2014 |
| JP | 2016-001236 A | 1/2016 |
| WO | 2001/013159 A1 | 2/2001 |
| WO | 2007031992 A1 | 3/2007 |
| WO | 2017210781 | 12/2017 |

OTHER PUBLICATIONS

English translation of Japanese Office action for corresponding Japanese application No. 2018-564974, dated Feb. 16, 2022.
Office Action for JP2018-564974, dated Sep. 2, 2021.
Communication from the Canadian Intellectual Property Office for corresponding Canadian application No. 3,026,789, dated Jun. 22, 2023.
Chinese Office Action in Chinese Application No. 201780048871.2, dated Nov. 25, 2020.
International Search Report and Written Opinion of the International Searching Authority of PCT/CA2020/050760, Aug. 11, 2020.
Extended European Search Report for European Patent Application No. 17809494.2, Jan. 21, 2020.
Noponen et al., "Electromagnetic theory of Talbot imaging", Optics Communications 98, 1993, pp. 132-140, North Holland.
Suleski, "Generation of Lohmann images from binary-phase Talbot array illuminators", Applied Optics, 36(20):4686-4691 (1997).
Wang, "A Light-Field Image Sensor in 180 nm CMOS", IEEE Journal of Solid-State Circuits, 47(1):257-271 (2012).
International Search Report and Written Opinion for PCT application PCT/CA2018/051554, dated Feb. 20, 2019.
International Search Report and Written Opinion for PCT application PCT/CA2017/050686, dated Aug. 24, 2017.
European Office Action for corresponding European application No. 17809494.2, dated Apr. 4, 2024.

* cited by examiner

LIGHT FIELD IMAGING DEVICE AND METHOD FOR DEPTH ACQUISITION AND THREE-DIMENSIONAL IMAGING

This application is a continuation of U.S. application Ser. No. 16/308,173, filed Dec. 7, 2018, which is a U.S. national phase entry under 35 U.S.C. § 371 of International Application No. PCT/CA2017/050686, filed Jun. 6, 2017, which claims priority to U.S. Provisional Patent Application No. 62/346,884, filed Jun. 7, 2016, each of which are incorporated herein by reference in their entirety.

TECHNICAL FIELD

The general technical field relates to imaging systems and methods and, more particularly, to a light field imaging device and method for depth acquisition and three-dimensional (3D) imaging.

BACKGROUND

Traditional imaging hardware involves the projection of complex three-dimensional (3D) scenes onto simplified two-dimensional (2D) planes, forgoing dimensionality inherent in the incident light. This loss of information is a direct result of the nature of square-law detectors, such as charge-coupled devices (CCD) or complementary metal-oxide-semiconductor (CMOS) sensor arrays, which can only directly measure the time-averaged intensity I of the incident light, not its phase, $\phi$, or wave vector, k, or angular frequency, $\omega$:

$$I \sim <E(t)>; \text{ where } E(t)=E_0 \cos(\vec{k}\cdot\vec{r}-\omega t+\phi). \quad (1)$$

Working within this constraint, plenoptic cameras are forced to recover depth information through either the comparative analysis of multiple simultaneously acquired images, complicated machine learning and/or reconstruction techniques, or the use of active illuminators and sensors. Plenoptic cameras generally describe a scene through the "plenoptic function" which parameterizes a light field impingent on an observer or point by:

$$P=P(x,y,\lambda,t,V_x,V_y,V_z,p) \quad (2)$$

where the x and y coordinates define a certain image plane at time t, for wavelength $\lambda$, and polarization angle p, as witnessed by an observer at location $(V_x, V_y, V_z)$. While they may be single- or multi-sensor based systems, current plenoptic cameras can rely, at minimum, solely on the intensity of light detected by any given pixel of a sensor array. More practically, existing solutions, such as stereovision or micro-lensing, sacrifice overall image quality and sensor footprint by employing multiple sensors or sensor segmentation to accommodate the various fields of view required to discern depth.

Random binary occlusion masks and coded apertures are other existing approaches that provide single-sensor solutions with minimal impact on packaging or overall footprint. However, despite advances in compressed sensing and non-linear reconstruction techniques, these solutions remain hindered by the massive image dictionaries and computational expense involved.

Time-of-flight and structured-light based techniques actively illuminate a scene with pulsed, patterned, or modulated continuous-wave infrared light, and determine depth via the full return-trip travel time or subtle changes in the illuminated light pattern. While these techniques do not suffer from image segmentation, they generally require additional active infrared emitters and detectors which both increase power consumption as well as overall device footprint. Similarly, these techniques tend to be sensitive to interfering signals, specular reflections, and ambient infrared light, thus limiting their viability outdoors.

Challenges therefore remain in the field of light field imaging.

SUMMARY

The present description generally relates to light field imaging techniques for depth mapping and other 3D imaging applications.

In accordance with an aspect, there is provided a light field imaging device for capturing light field image data about a scene, the light field imaging device including:
  a diffraction grating assembly configured to receive an optical wavefront originating from the scene, the diffraction grating assembly including a diffraction grating having a grating axis and a refractive index modulation pattern having a grating period along the grating axis, the diffraction grating diffracting the optical wavefront to generate a diffracted wavefront; and
  a pixel array including a plurality of light-sensitive pixels disposed under the diffraction grating assembly and detecting the diffracted wavefront as the light field image data, the pixel array having a pixel pitch along the grating axis that is smaller than the grating period.

In some implementations, the diffracted wavefront has an intensity profile along the grating axis, and the pixel array is separated from the diffraction grating by a separation distance at which the intensity profile of the diffracted wavefront has a spatial period that substantially matches the grating period.

In accordance with another aspect, there is provided a backside-illuminated light field imaging device for capturing light field image data about a scene, the backside-illuminated light field imaging device including:
  a substrate having a front surface and a back surface;
  a diffraction grating assembly disposed over the back surface of the substrate and configured to receive an optical wavefront originating from the scene, the diffraction grating assembly including a diffraction grating having a grating axis and a refractive index modulation pattern having a grating period along the grating axis, the diffraction grating diffracting the optical wavefront to generate a diffracted wavefront;
  a pixel array formed in the substrate and including a plurality of light-sensitive pixels configured to receive through the back surface and detect as the light field image data the diffracted wavefront, the pixel array having a pixel pitch along the grating axis that is smaller than the grating period; and
  pixel array circuitry disposed under the front surface and coupled to the pixel array.

In some implementations, the diffracted wavefront has an intensity profile along the grating axis, and the pixel array is separated from the diffraction grating by a separation distance at which the intensity profile of the diffracted wavefront has a spatial period that substantially matches the grating period.

In accordance with another aspect, there is provided a light field imaging device including:
  a diffraction grating assembly including a diffraction grating having a grating axis and a refractive index modulation pattern having a grating period along the grating axis; and a pixel array including a plurality of light-sensitive pixels disposed under the diffraction grating, the pixel array having a pixel pitch along the grating axis that is smaller than the grating period.

In accordance with another aspect, there is provided a diffraction grating assembly for use with an image sensor including a pixel array having a plurality of light-sensitive pixels to capture light field image data about a scene, the diffraction grating assembly including a diffraction grating having a grating axis and a refractive index modulation pattern having a grating period along the grating axis, the grating period being larger than a pixel pitch of the pixel array along the grating axis, the diffraction grating being configured to receive and diffract an optical wavefront originating from the scene to generate a diffracted wavefront for detection by the light-sensitive pixels as the light field image data, the diffraction grating assembly being configured to be disposed over the pixel array. In some implementations, the diffraction grating assembly is configured to be separated from the pixel array by a separation distance at which the diffracted wavefront has an intensity profile along the grating axis with a spatial period that substantially matches the grating period.

In accordance with another aspect, there is provided a method of capturing light field image data about a scene, the method including:
- diffracting an optical wavefront originating from the scene with a diffraction grating having a grating period along a grating axis to generate a diffracted wavefront; and
- detecting the diffracted wavefront as the light field image data with a pixel array including a plurality of light-sensitive pixels disposed under the diffraction grating, the pixel array having a pixel pitch along the grating axis that is smaller than the grating period.

In some implementations, the diffracted wavefront has an intensity profile along the grating axis, and the pixel array is separated from the diffraction grating by a separation distance at which the intensity profile of the diffracted wavefront has a spatial period that substantially matches the grating period.

In accordance with another aspect, there is provided a method of providing three-dimensional imaging capabilities to an image sensor viewing a scene and including a pixel array having a plurality of light-sensitive pixels, the method including:
- disposing a diffraction grating assembly in front of the image sensor, the diffraction grating assembly including a diffraction grating having a grating axis and a grating period along the grating axis, the grating period being larger than a pixel pitch of the pixel array along the grating axis;
- receiving and diffracting an optical wavefront originating from the scene with the diffraction grating to generate a diffracted wavefront; and
- detecting the diffracted wavefront with the light-sensitive pixels.

In some implementations, disposing the diffraction grating assembly in front of the image sensor includes positioning the diffraction grating assembly at a separation distance from the pixel array at which the diffracted wavefront has an intensity profile along the grating axis with a spatial period that substantially matches the grating period.

In some implementations, the light field imaging device can include an array of light-sensitive elements; an array of color filters overlying and aligned with the array of photosensitive elements such that each color filter covers at least one of the light-sensitive elements, the color filters being spatially arranged according to a mosaic color pattern; and a diffraction grating structure extending over the array of color filters.

In some implementations, the light field imaging device can include a diffraction grating structure exposed to an optical wavefront incident from a scene, the diffraction grating structure diffracting the optical wavefront to produce a diffracted wavefront; an array of color filters spatially arranged according to a mosaic color pattern, the array of color filters extending under the diffraction grating structure and spatio-chromatically filtering the diffracted wavefront according to the mosaic color pattern to produce a filtered wavefront including a plurality of spatially distributed wavefront components; and an array of light-sensitive elements detecting the filtered wavefront as light field image data, the array of light-sensitive elements underlying and being aligned with the array of color filters such that each light-sensitive element detects at least a corresponding one of the spatially distributed wavefront components.

In some implementations, the method can include diffracting an optical wavefront incident from a scene to produce a diffracted wavefront; filtering the diffracted wavefront through an array of color filters spatially arranged according to a mosaic color pattern, thereby obtaining a filtered wavefront including a plurality of spatially distributed wavefront components; and detecting the filtered wavefront as light field image data with an array of light-sensitive elements underlying and aligned with the array of color filters such that each light-sensitive element detects at least part of a corresponding one of the spatially distributed wavefront components.

In some implementations, the method can include diffracting an optical wavefront incident from a scene to produce a diffracted wavefront; spectrally and spatially filtering the diffracted wavefront to produce a filtered wavefront including a plurality of spatially distributed and spectrally filtered wavefront components; and detecting as light field image data the plurality of spatially distributed and spectrally filtered wavefront components at a plurality of arrayed light-sensitive elements.

Other features and advantages of the present description will become more apparent upon reading of the following non-restrictive description of specific embodiments thereof, given by way of example only with reference to the appended drawings.

BRIEF DESCRIPTION OF THE DRAWINGS

In FIG. 8A, each light-sensitive pixel is vertically aligned with a transition between one ridge and one groove. In FIG. 8B, the ratio of the grating period to the pixel pitch along the grating axis is equal to four. In FIG. 8C, the duty cycle of the diffraction grating is different from 50%.

DETAILED DESCRIPTION

Figure 1:
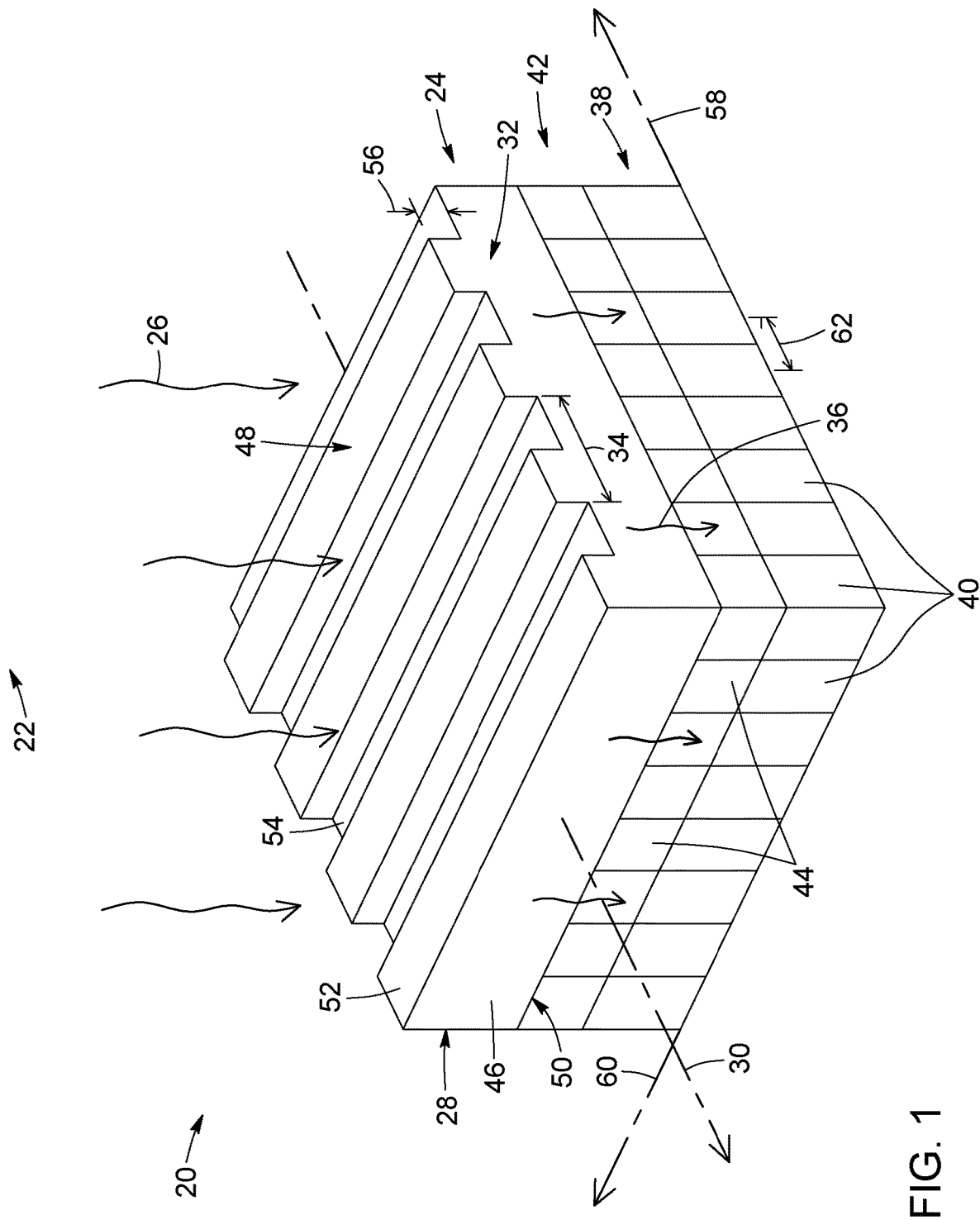
FIG. 1 is a schematic perspective view of a light field imaging device, in accordance with a possible embodiment.

In the present description, similar features in the drawings have been given similar reference numerals, and, to not unduly encumber the figures, some elements may not be indicated on some figures if they were already identified in a preceding figure. It should also be understood that the elements of the drawings are not necessarily depicted to scale, since emphasis is placed upon clearly illustrating the elements and structures of the present embodiments.

In the present description, and unless stated otherwise, the terms "connected", "coupled" and variants and derivatives thereof refer to any connection or coupling, either direct or indirect, between two or more elements. The connection or coupling between the elements may be mechanical, optical, electrical, operational or a combination thereof. It will also be appreciated that positional descriptors and other like terms indicating the position or orientation of one element with respect to another element are used herein for ease and clarity of description and should, unless otherwise indicated, be taken in the context of the figures and should not be considered limiting. It will be understood that such spatially relative terms are intended to encompass different orientations in use or operation of the present embodiments, in addition to the orientations exemplified in the figures. More particularly, it is to be noted that in the present description, the terms "over" and "under" in specifying the relative spatial relationship of two elements denote that the two elements can be either in direct contact with each other or separated from each other by one or more intervening elements.

In the present description, the terms "a", "an" and "one" are defined to mean "at least one", that is, these terms do not exclude a plural number of items, unless specifically stated otherwise.

The present description generally relates to light field imaging techniques for acquiring light field information or image data about an optical wavefront emanating from a scene. In accordance with various aspects, the present description relates to a light field imaging device for capturing light field image data about a scene, for example a backside-illuminated light field imaging device; a diffraction grating assembly for use with an image sensor to obtain light field image data about a scene; a method of capturing light field image data about a scene; and a method of providing three-dimensional (3D) imaging capabilities to an image sensor array viewing a scene.

In some implementations, the present techniques enable the specific manipulation and comparison of the chromatic dependence of diffraction by means of one or many diffractive optical elements paired with an appropriate chromatic encoding mechanism, as well as its use in 3D imaging. In some implementations, the light field imaging devices and methods disclosed herein are sensitive to not only the intensity and angle of incidence of an optical wavefront originating from an observable scene, but also the wavelength, through a specific spatio-spectral subsampling of a generated interference pattern allowing for direct measurement of the chromatic dependence of diffraction. Light field information or image data, can include information about not only the intensity of the optical wavefront emanating from an observable scene, but also other light field parameters including, without limitation, the angle of incidence, the phase, the wavelength and the polarization of the optical wavefront. Therefore, light field imaging devices, for example depth cameras, can acquire more information than traditional cameras, which typically record only light intensity. The image data captured by light field imaging devices can be used or processed in a variety of ways to provide multiple functions including, but not limited to, 3D depth map extraction, 3D surface reconstruction, image refocusing, and the like. Depending on the application, the light field image data of an observable scene can be acquired as one or more still images or as a video stream.

The present techniques can be used in imaging applications that require or can benefit from enhanced depth sensing and other 3D imaging capabilities, for example to allow a user to change the focus, the point of view and/or the depth of field of a captured image of a scene. The present techniques can be applied to or implemented in various types of 3D imaging systems and methods including, without limitation, light field imaging applications using plenoptic descriptions, ranging applications through the comparative analysis of the chromatic dependence of diffraction, and single-sensor single-image depth acquisition applications. Non-exhaustive advantages and benefits of certain implementations of the present techniques can include: compatibility with passive sensing modalities that employ less power to perform their functions; compatibility with single-sensor architectures having reduced footprint; enablement of depth mapping functions while preserving 2D performance; simple and low-cost integration into existing image sensor hardware and manufacturing processes; compatibility with conventional CMOS and CCD image sensors; and elimination of the need for multiple components, such as dual cameras or cameras equipped with active lighting systems for depth detection.

In the present description, the terms "light" and "optical" are used to refer to radiation in any appropriate region of the electromagnetic spectrum. More particularly, the terms "light" and "optical" are not limited to visible light, but can also include invisible regions of the electromagnetic spectrum including, without limitation, the terahertz (THz), infrared (IR) and ultraviolet (UV) spectral bands. In some implementations, the terms "light" and "optical" can encompass electromagnetic radiation having a wavelength ranging from about 175 nanometers (nm) in the deep ultraviolet to about 300 micrometers (µm) in the terahertz range, for example from about 400 nm at the blue end of the visible spectrum to about 1550 nm at telecommunication wavelengths, or between about 400 nm and about 650 nm to match the spectral range of typical red-green-blue (RGB) color filters. Those skilled in the art will understand, however, that these wavelength ranges are provided for illustrative purposes only and that the present techniques may operate beyond this range.

In the present description, the terms "color" and "chromatic", and variants and derivatives thereof, are used not only in their usual context of human perception of visible electromagnetic radiation (e.g., red, green and blue), but also, and more broadly, to describe spectral characteristics (e.g., diffraction, transmission, reflection, dispersion, absorption) over any appropriate region of the electromagnetic spectrum. In this context, and unless otherwise specified, the terms "color" and "chromatic" and their derivatives can be used interchangeably with the term "spectral" and its derivatives.

Light Field Imaging Device Implementations

Figure 2:
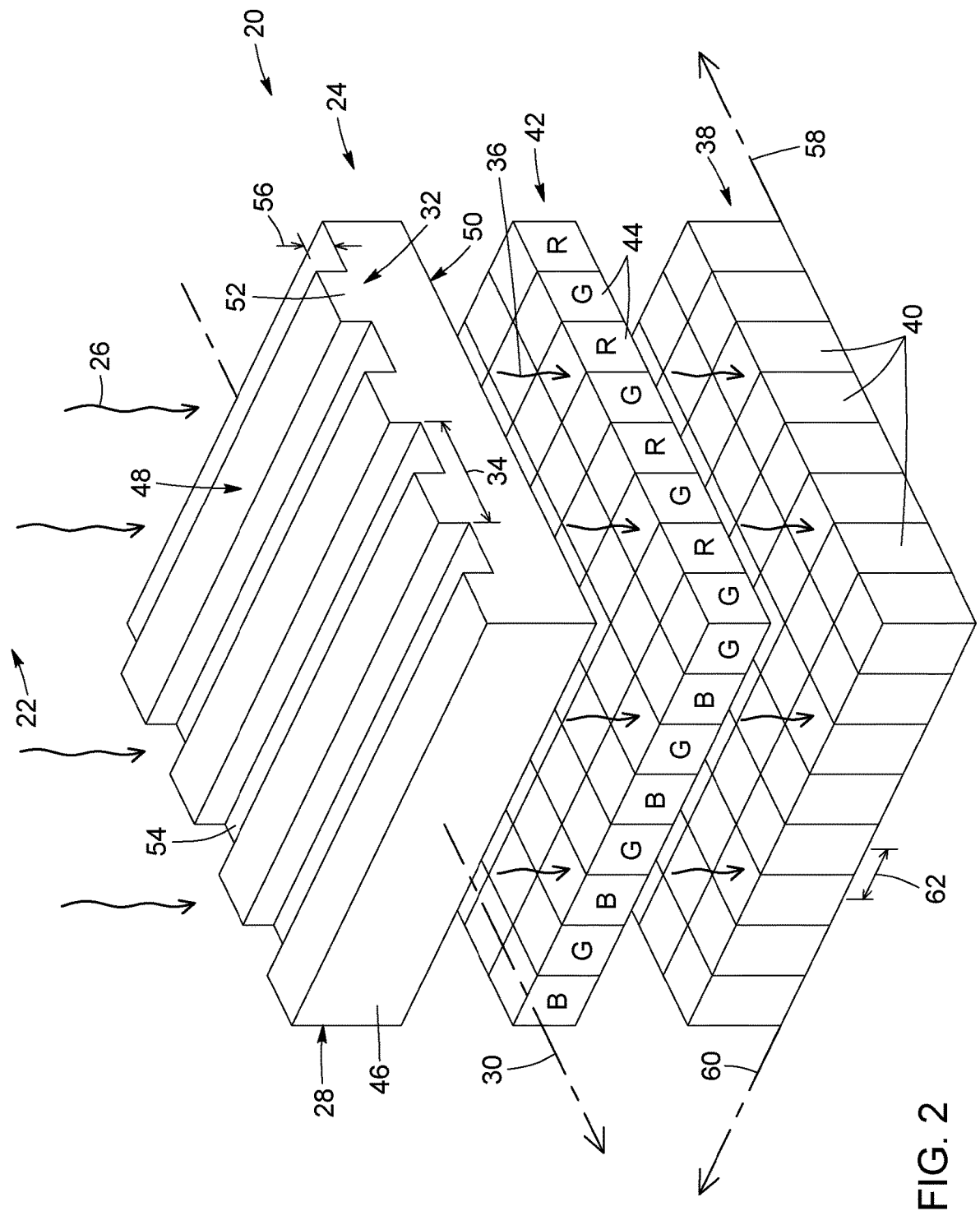
FIG. 2 is a schematic partially exploded perspective view of the light field imaging device of FIG. 1.

Referring to FIGS. 1 and 2, there is provided a schematic representation of an exemplary embodiment of a light field imaging device 20 for capturing light field or depth image data about an observable scene 22. In the present description, the term "light field imaging device" broadly refers to any image capture device capable of acquiring an image representing a light field or wavefront emanating from a scene and containing information about not only light intensity at the image plane, but also other light field parameters such as, for example, the direction from which light rays enter the device and the spectrum of the light field. It is to be noted that in the present description, the term "light field imaging device" can be used interchangeably with terms such as "light field camera", "light field imager", "light field image capture device", "depth image capture device", "3D image capture device", and the like.

In the illustrated embodiment, the light field imaging device 20 includes a diffraction grating assembly or structure 24 configured to receive an optical wavefront 26 originating from the scene 22. The diffraction grating assembly 24 can include at least one diffraction grating 28, each of which having a grating axis 30 and a refractive index modulation pattern 32 having a grating period 34 along the grating axis 30. In FIGS. 1 and 2, the diffraction grating assembly 24 includes a single diffraction grating 28, but as described below, in other embodiments the diffraction grating assembly can include more than one diffraction grating. The diffraction grating 28 is configured to diffract the incoming optical wavefront 26, thereby generating a diffracted wavefront 36. The diffraction grating 28 in FIGS. 1 and 2 is used in transmission since the incident optical wavefront 26 and the diffracted wavefront 36 lie on opposite sides of the diffraction grating 28.

Referring still to FIGS. 1 and 2, the light field imaging device 20 also includes a pixel array 38 comprising a plurality of light-sensitive pixels 40 disposed under the diffraction grating assembly 24 and configured to detect the diffracted wavefront 36 as the light field image data about the scene 22. In color implementations, the light field imaging device 20 can also include a color filter array 42 disposed over the pixel array 38. The color filter array 42 includes a plurality of color filters 44 arranged in a mosaic color pattern, each of which filters incident light by wavelength to capture color information at a respective location in the color filter array 42. The color filter array 42 is configured to spatially and spectrally filter the diffracted wavefront 36 according to the mosaic color pattern prior to detection of the diffracted wavefront 36 by the plurality of light-sensitive pixels 40. Therefore, as mentioned above, by providing a color filter array to perform a direct spatio-chromatic subsampling of the diffracted wavefront generated by the diffraction grating assembly prior to its detection by the pixel array, the light field imaging device can be sensitive to not only the angle and intensity of an incident wavefront of light, but also its spectral content.

It is to be noted that a color filter array need not be provided in some applications, for example for monochrome imaging. It is also to be noted that the wavefront detected by the light-sensitive pixels will be generally referred to as a "diffracted wavefront" in both monochrome and color implementations, although in the latter case, the terms "filtered wavefront" or "filtered diffracted wavefront" may, in some instances, be used to denote the fact that the diffracted wavefront generated by the diffraction grating assembly is both spatially and spectrally filtered by the color filter array prior to detection by the underlying pixel array. It is also to be noted that in some implementations where a color filter array is not provided, it may be envisioned that the diffraction grating could act as a color filter. For example, the diffraction grating could include a grating substrate with a top surface having the refractive index modulation pattern formed thereon, the grating substrate including a spectral filter material or region configured to spectrally filter the diffracted wavefront according to wavelength prior to detection of the diffracted wavefront by the plurality of light-sensitive pixels. For example, the spectral filter material or region could act as one of a red pass filter, a green pass filter and a blue pass filter.

Depending on the application or use, embodiments of the light field imaging device can be implemented using various image sensor architectures and pixel array configurations. For example, in some implementations, the light field imaging device can be implemented simply by adding or coupling a diffraction grating assembly on top of an already existing image sensor including a pixel array and, in color-based applications, a color filter array. For example, the existing image sensor can be a conventional 2D CMOS or CCD imager. However, in other implementations, the light field imaging device can be implemented and integrally packaged as a separate, dedicated and/or custom-designed device incorporating therein all or most of its components (e.g., diffraction grating assembly, pixel array, color filter array).

More detail regarding the structure, configuration and operation of the components introduced in the preceding paragraphs as well as other possible components of the light field imaging device will be described below.

In the embodiment illustrated in FIGS. 1 and 2, the diffraction grating 28 includes a grating substrate 46 extending over the color filter array 42. The grating substrate 46 has a top surface 48, on which is formed the periodic refractive index modulation pattern 32, and a bottom surface 50. The grating substrate 46 is made of a material that is transparent, or sufficiently transparent, in the spectral operating range to permit the diffracted wavefront 36 to be transmitted therethrough. Non-limiting examples of such material include silicon oxide (SiOx), polymers, colloidal particles, SU-8 photoresist, glasses. For example, in some implementations the diffraction grating 28 can be configured to diffract the optical wavefront 26 in a waveband ranging from about 400 nm to about 1550 nm.

As known in the art, diffraction occurs when a wavefront, whether electromagnetic or otherwise, encounters a physical object or a refractive-index perturbation. The wavefront tends to bend around the edges of the object. Should a wavefront encounter multiple objects, whether periodic or otherwise, the corresponding wavelets may interfere some distance away from the initial encounter as demonstrated by Young's double slit experiment. This interference creates a distinct pattern, referred to as a "diffraction pattern" or "interference pattern", as a function of distance from the original encounter, which is sensitive to the incidence angle and the spectral content of the wavefront, and the general size, shape, and relative spatial relationships of the encountered objects. This interference can be described through the evolving relative front of each corresponding wavelet, as described by the Huygens-Fresnel principle.

In the present description, the term "diffraction grating", or simply "grating", generally refers to a periodic structure having periodically modulated optical properties (e.g., a refractive index modulation pattern) that spatially modulates the amplitude and/or the phase of an optical wavefront incident upon it. A diffraction grating can include a periodic arrangement of diffracting elements (e.g., alternating ridges and grooves) whose spatial period—the grating period—is nearly equal to or slightly longer than the wavelength of light. An optical wavefront containing a range of wavelengths incident on a diffraction grating will, upon diffraction, have its amplitude and/or phase modified, and, as a result, a space- and time-dependent diffracted wavefront is produced. In general, a diffracting grating is spectrally dispersive so that each wavelength of an input optical wavefront will be outputted along a different direction. However, diffraction gratings exhibiting a substantially achromatic response over an operating spectral range exist and can be used in some implementations. For example, in some implementations, the diffraction grating can be achromatic in the spectral range of interest and be designed for the center wavelength of the spectral range of interest. More particularly, in the case of a Bayer patterned color filter array, the diffraction grating can be optimized for the green channel, that is, around a center wavelength of about 532 nm. It is to be noted that when the diffraction grating is achromatic, it is the mosaic color patter of the color filter array that provides the chromatic sub-sampling of the diffraction pattern of the diffracted wavefront.

Depending on whether the diffracting elements forming the diffraction grating are transmitting or reflective, the diffraction grating will be referred to as a "transmission grating" or a "reflection grating". In the embodiments disclosed in the present description, the diffracting gratings are transmission gratings, although the use of reflection gratings is not excluded a priori. Diffraction gratings can also be classified as "amplitude gratings" or "phase gratings", depending on the nature of diffracting elements. In amplitude gratings, the perturbations to the initial wavefront caused by the grating are the result of a direct amplitude modulation, while in phase gratings, these perturbations are the result of a specific modulation of the relative group-velocity of light caused by a periodic variation of the refractive index of the grating material. In the embodiments disclosed in the present description, the diffracting gratings are phase gratings, although amplitude gratings can be used in other embodiments.

In the illustrated embodiment of FIGS. 1 and 2, the diffraction grating 28 is a phase grating, more specifically a binary phase grating for which the refractive index modulation pattern 32 includes a series of ridges 52 periodically spaced-apart at the grating period 34, interleaved with a series of grooves 54 also periodically spaced-apart at the grating period 34. The spatial profile of the refractive index modulation pattern 32 thus exhibits a two-level step function, or square-wave function, for which the grating period 34 corresponds to the sum of the width, along the grating axis 30, of one ridge 52 and one adjacent groove 54. In some implementations, the grating period 34 can range from about 1 µm to about 20 µm, although other values are possible in other implementations. In the illustrated embodiment of FIGS. 1 and 2, the grooves 54 are empty (i.e., they are filled with air), but they could alternatively be filled with a material having a refractive index different from that of the ridge material. Also, depending on the application, the diffraction grating 28 can have a duty cycle substantially equal to or different from 50%, the duty cycle being defined as the ratio of the ridge width to the grating period 34. Another parameter of the diffraction grating 28 is the step height 56, that is, the difference in level between the ridges 52 and the grooves 54. For example, in some implementations the step height 56 can range from about 0.2 µm to about 1 µm. It is to be noted that in some implementations, the step height 56 can be selected so that the diffraction grating 28 causes a predetermined optical path difference between adjacent ridges 52 and grooves 54. For example, the step height 56 can be controlled to provide, at a given wavelength and angle of incidence of the optical wavefront (e.g. its center wavelength), a half-wave optical path difference between the ridges and the grooves. Of course, other optical path difference values can be used in other implementations.

It is to be noted that while the diffraction grating 28 in the embodiment of FIGS. 1 and 2 is a linear, or one-dimensional, binary phase grating consisting of alternating sets of parallel ridges 52 and grooves 54 forming a square-wave refractive index modulation pattern 32, other embodiments can employ different types of diffraction gratings. For example, other implementations can use diffraction gratings where at least one among the grating period, the duty cycle and the step height is variable; diffraction gratings with non-straight features perpendicular to the grating axis; diffraction gratings having more elaborate refractive index profiles; 2D diffraction gratings; and the like. It will be understood that the properties of the diffracted wavefront can be tailored by proper selection of the grating parameters. More detail regarding the operation of the diffraction grating and its positioning relative and optical coupling to the other components of the light field imaging device will be described further below.

Referring still to FIGS. 1 and 2, as mentioned above, the pixel array 38 includes a plurality of light-sensitive pixels 40 disposed under the color filter array 42, which is itself disposed under the diffraction grating assembly 24. The term "pixel array" refers generally to a sensor array made up of a plurality of photosensors, referred to herein as "light-sensitive pixels" or simply "pixels", which are configured to detect electromagnetic radiation incident thereonto from an observable scene and to generate an image of the scene, typically by converting the detected radiation into electrical data. In the present techniques, the electromagnetic radiation that is detected by the light-sensitive pixels 40 as light field image data corresponds to an optical wavefront 26 incident from the scene 22, which has been diffracted and, optionally, spatio-chromatically filtered, prior to reaching the pixel array 38. The pixel array 38 can be embodied by a CMOS or a CCD image sensor, but other types of photodetector arrays (e.g., charge injection devices or photodiode arrays) could alternatively be used. As mentioned above, the pixel array 38 can be configured to detect electromagnetic radiation in any appropriate region of the spectrum. Depending on the application, the pixel array 38 may be configured according to either a rolling or global shutter readout design. The pixel array 38 may further be part of a stacked, backside, or frontside illumination sensor architecture, as described in greater detail below. The pixel array 38 may be of any standard or non-standard optical format, for example, but not limited to, ⅔", 1", ⅔", 1/1.8", ½", 1.27", ⅓", 1/3.2", 1/3.6", 35 mm, and the like. The pixel array 38 may also include either a contrast or a phase-detection autofocus mechanism and their respective pixel architectures. It is to be noted that in the present description, the term "pixel array" can be used interchangeably with terms such as "photodetector array", "photosensor array", "imager array", and the like.

Each light-sensitive pixel 40 of the pixel array 38 can convert the spatial part of the diffracted wavefront 36 incident upon it into accumulated charge, the amount of which is proportional to the amount of light collected and registered by the pixel 40. Each light-sensitive pixel 40 can include a light-sensitive surface and associated pixel circuitry for processing signals at the pixel level and communicating with other electronics, such as a readout unit. Those skilled in the art will understand that various other components can be integrated into the pixel circuitry of each pixel. In general, the light-sensitive pixels 40 can be individually addressed and read out.

Referring still to FIGS. 1 and 2, the light-sensitive pixels 40 can be arranged into a rectangular grid of rows and columns defined by two orthogonal pixel axes 58, 60, the number of rows and columns defining the resolution of the pixel array 38. For example, in some implementations, the pixel array 38 can have a resolution of at least 16 pixels, although a wide range of other resolution values, including up to 40 megapixels or more, can be used in other embodiments. It is to be noted that while the light-sensitive pixels 40 are organized into a 2D array in the embodiment of FIGS. 1 and 2, they may alternatively be configured as a linear array in other embodiments. It is also to be noted that while the light-sensitive pixels 40 are square in the embodiment of FIGS. 1 and 2, corresponding to a pixel aspect ratio of 1:1, other pixel aspect ratio values can be used in other embodiments.

The pixel array 38 can also be characterized by a pixel pitch 62. In the present description, the term "pixel pitch" generally refers to the spacing between the individual pixels 40 and is typically defined as the center-to-center distance between adjacent pixels 40. Depending on the physical arrangement of the pixel array 38, the pixel pitch 62 along the two orthogonal pixel axes 58, 60 may or may not be the same. It is to be noted that a pixel pitch can also be defined along an arbitrary axis, for example along a diagonal axis oriented at 45° with respect to the two orthogonal pixel axes 58, 60. It is also to be noted that, in the present techniques, a relevant pixel pitch 62 is the one along the grating axis 30 of the overlying diffraction grating 28, as depicted in FIGS. 1 and 2. As described in greater detail below, the grating period 34 of the diffraction grating 28 is selected to be larger than the pixel pitch 62 of the pixel array 38 along the grating axis 30. For example, in some implementations the pixel pitch 62 along the grating axis 30 can range from 1 μm or less to 10 μm, although different pixel pitch values can be used in other implementations.

In the present description, the term "pixel data" refers to the image information captured by each individual pixel and can include intensity data indicative of the total amount of optical energy absorbed by each individual pixel over an integration period. Combining the pixel data from all the pixels 40 yields light field image data about the scene 22. In the present techniques, because the optical wavefront 26 incident from the scene 22 is diffracted and, possibly, spatially and spectrally filtered prior to detection, the light field image data can provide information about not only the intensity of the incident wavefront 26, but also other light field parameters such as its angle of incidence, phase and spectral content. More particularly, it will be understood that the present techniques can allow recovery or extraction of depth or other light field information from the intensity-based diffraction pattern captured by the pixel array 38, as described further below.

Figure 3:
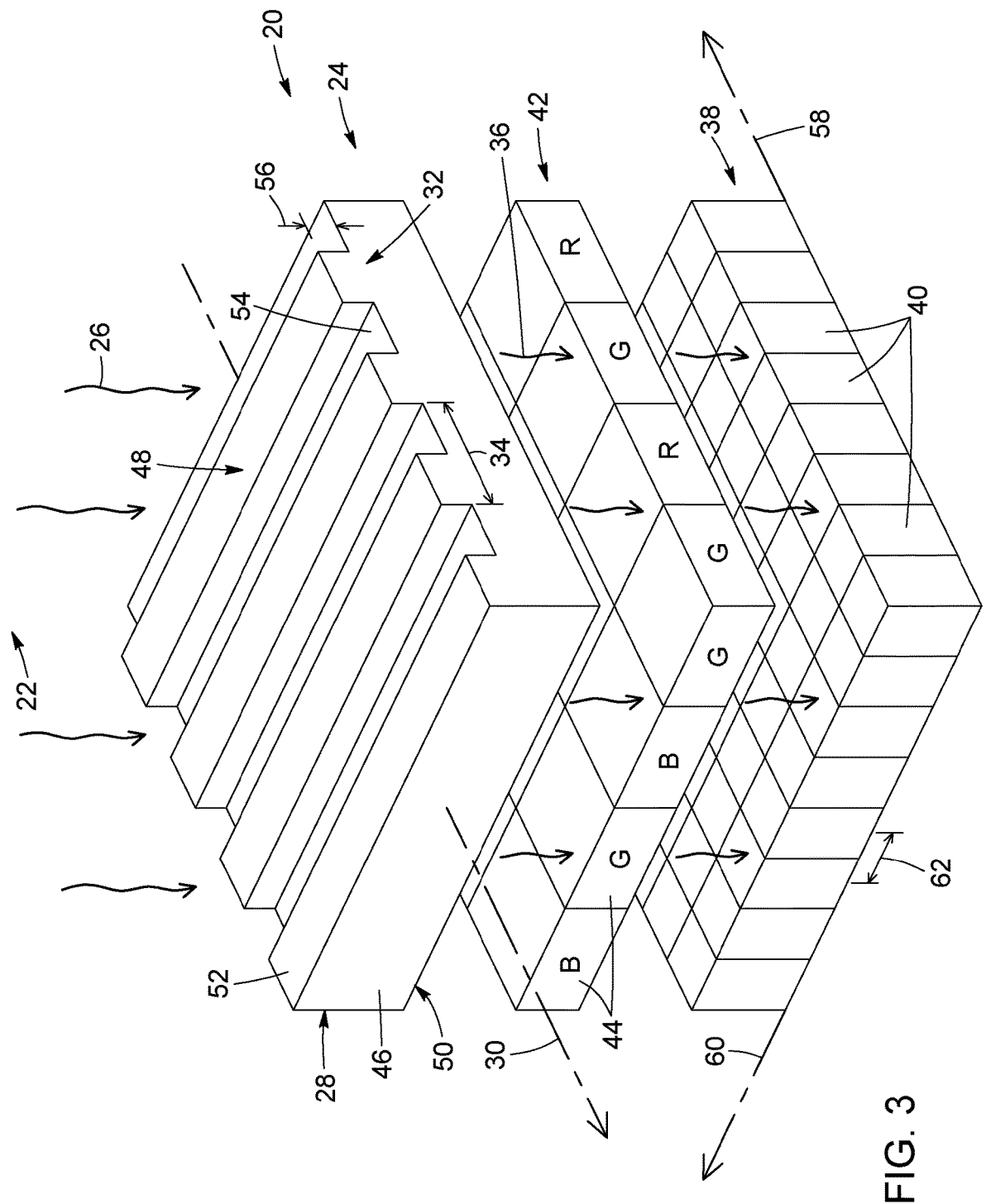
FIG. 3 is a schematic partially exploded perspective view of a light field imaging device, in accordance with another possible embodiment, where each color filter overlies a 2×2 block of light-sensitive pixels.

Referring still to FIGS. 1 and 2, the color filter array 42 is spatially registered with the pixel array 38, such that each color filter 44 is optically coupled to a corresponding one of the light-sensitive pixels 40. That is, each color filter 44 covers a single light-sensitive pixel 40, such that there is a one-to-one relationship, or mapping, between the color filters 44 and the light-sensitive pixels 40. However, in other implementations, each color filter can be optically coupled to at least two corresponding ones of the plurality of light-sensitive pixels. For example, turning briefly to FIG. 3, there is shown another embodiment of a light field imaging device 20 in which each color filter 44 of the color filter array 42 overlies a group or subset of light-sensitive pixels 40, namely a 2×2 block of light-sensitive pixels 40. In both the embodiment of FIGS. 1 and 2 and the embodiment of FIG. 3, the color filter array 42 and the pixel array 38 together enable the direct spatio-chromatic sampling of the diffracted wavefront produced by the overlying diffraction grating assembly 24, as detailed and explained below.

As mentioned above regarding the terms "color" and "chromatic", terms such as "color filter" and "color filtering" are to be understood as being equivalent to "spectral filter" and "spectral filtering" in any appropriate spectral range of the electromagnetic spectrum, and not only within the visible range. Depending on the application, the color filters can achieve spectral filtering through absorption of unwanted spectral components, for example using dye-based color filters, although other filtering principles may be used without departing from the scope of the present techniques.

Returning to FIGS. 1 and 2, the color filters 44 are physically organized according to a mosaic color pattern or configuration. In some implementations, each color filter 44 is one of a red pass filter, a green pass filter and a blue pass filter. For example, in the illustrated embodiment, the mosaic color pattern of the color filter array 42 is a Bayer pattern, in which the color filters arranged in a checkerboard pattern with rows of alternating red (R) and green (G) filters are interleaved with rows of alternating green (G) and blue (B) filters. As known in the art, a Bayer pattern contains twice as many green filters as red or blue filters, such that the green component of the mosaic color pattern is more densely sampled than red and blue components. In alternative implementations, the mosaic color pattern can be embodied by more elaborate Bayer-type patterns, for example Bayer-type patterns with an n-pixel unit cell, where n is an integer greater than 4. Of course, the present techniques are not limited to Bayer-type patterns, but can be applied to any appropriate mosaic color pattern including, but not limited to, RGB, RGB-IR, RGB-W, CYGM, CYYM, RGBE, RGBW #1, RGBW #2, RGBW #3, and monochrome. It is to be noted that in some implementations, the color filter array 42 may be extended beyond the standard visible Bayer pattern to include hyperspectral imaging and filtering techniques or interferometric filtering techniques. In such embodiments, the design of the diffraction grating 28 (e.g., the grating period 34) can be adjusted to accommodate the increased spectral sampling range.

Figure 4:
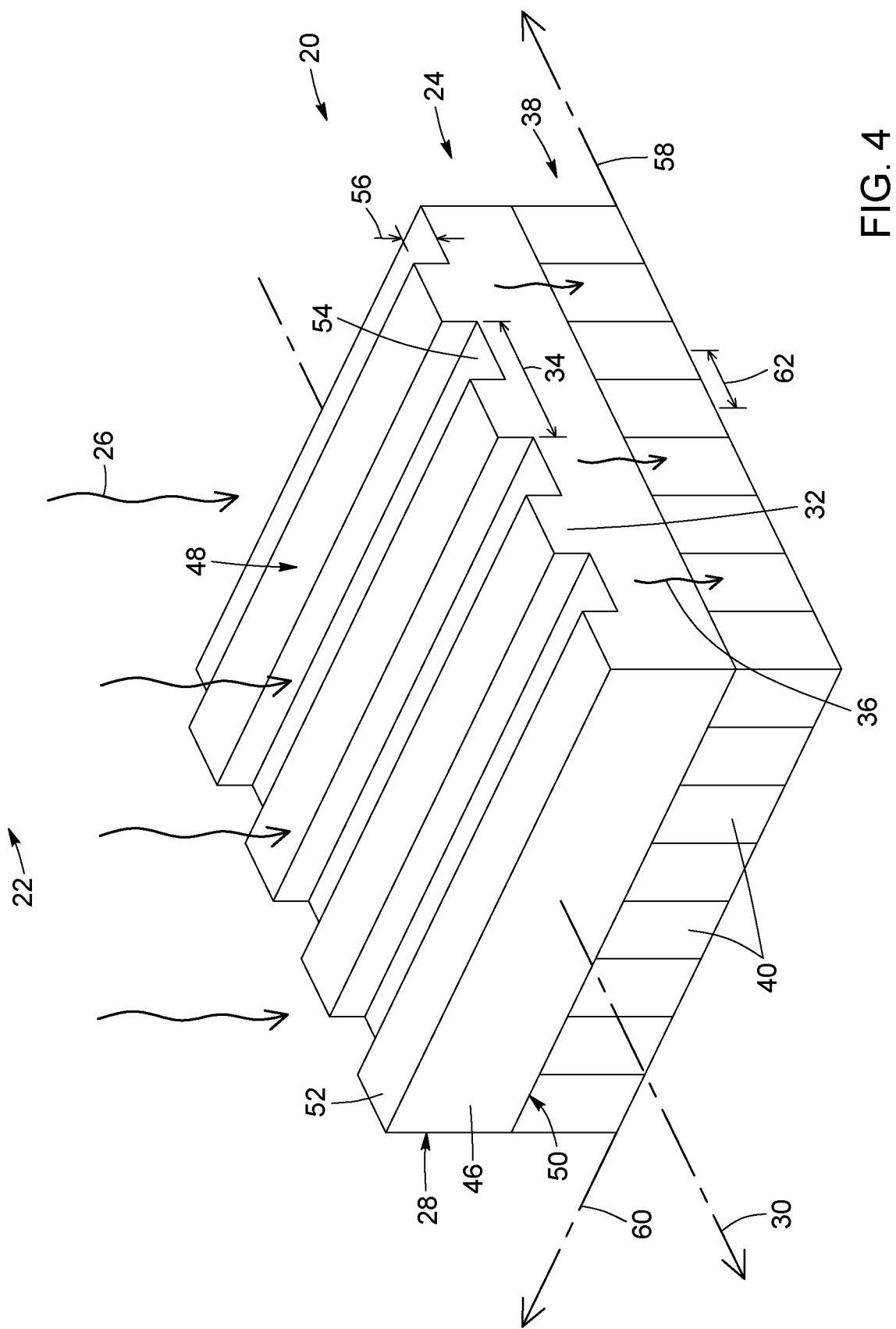
FIG. 4 is a schematic perspective view of a light field imaging device, in accordance with another possible embodiment, where the light field imaging device is configured for monochrome imaging applications.
Figure 5:
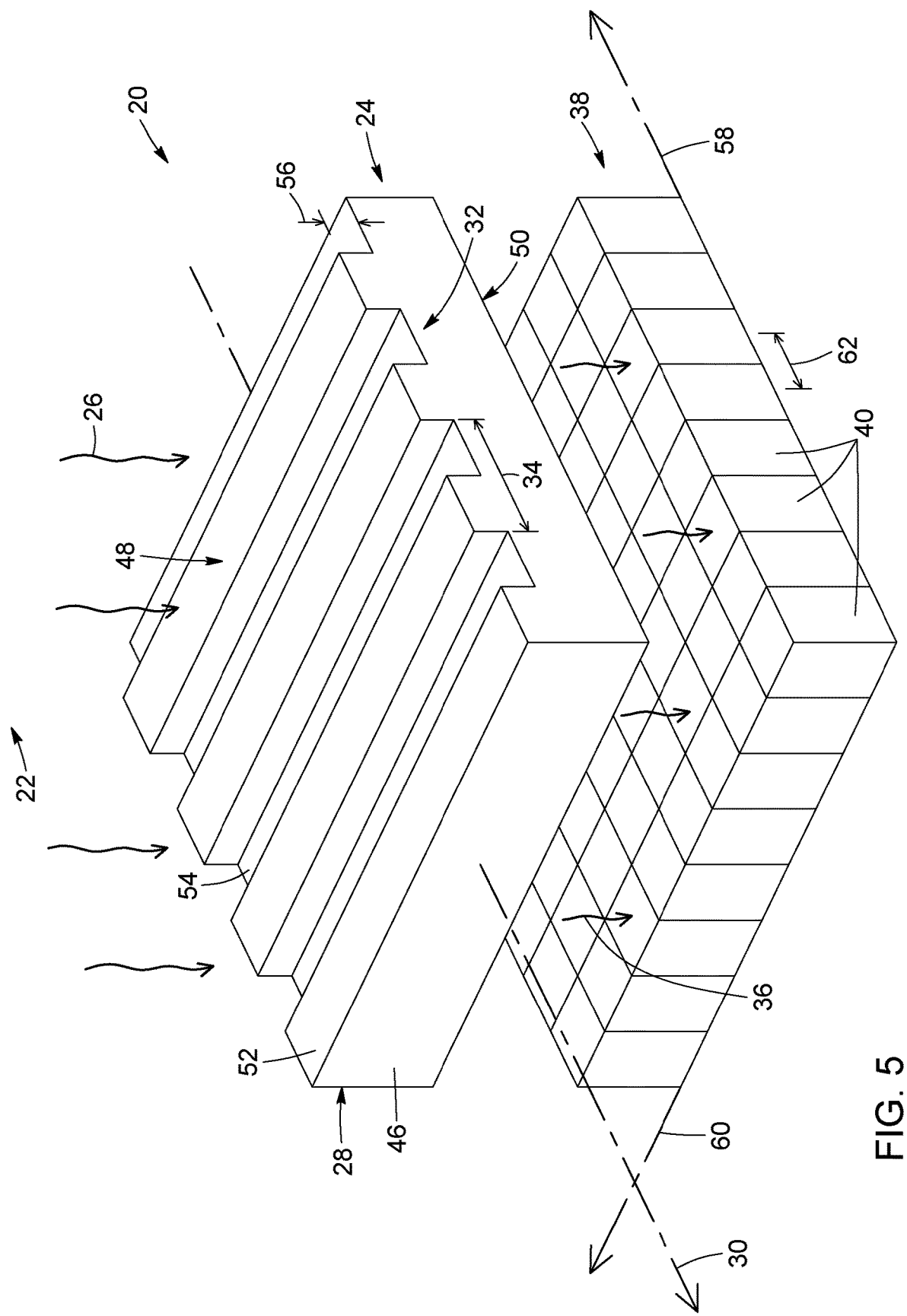
FIG. 5 is a schematic partially exploded perspective view of the light field imaging device of FIG. 4.

Referring now to FIGS. 4 and 5, there is shown another embodiment of a light field imaging device 20, which is suitable for monochrome imaging applications. This embodiment shares many features with the embodiment described above and illustrated in FIGS. 1 and 2, insofar as it generally includes a diffraction grating assembly 24 including at least one diffraction grating 28 and disposed over a pixel array 38 including a plurality of light-sensitive pixels 40. These components can generally be similar in terms of structure and operation to like components of the embodiment of FIGS. 1 and 2. The light field imaging device 20 of FIGS. 4 and 5 differs from that of FIGS. 1 and 2 mainly in that it does not include a color filter array disposed between the diffraction grating assembly 24 and the pixel array 38. As a result, the light-sensitive pixels 40 directly detect the diffracted wavefront 36 transmitted by the diffraction grating 28.

Figure 6:
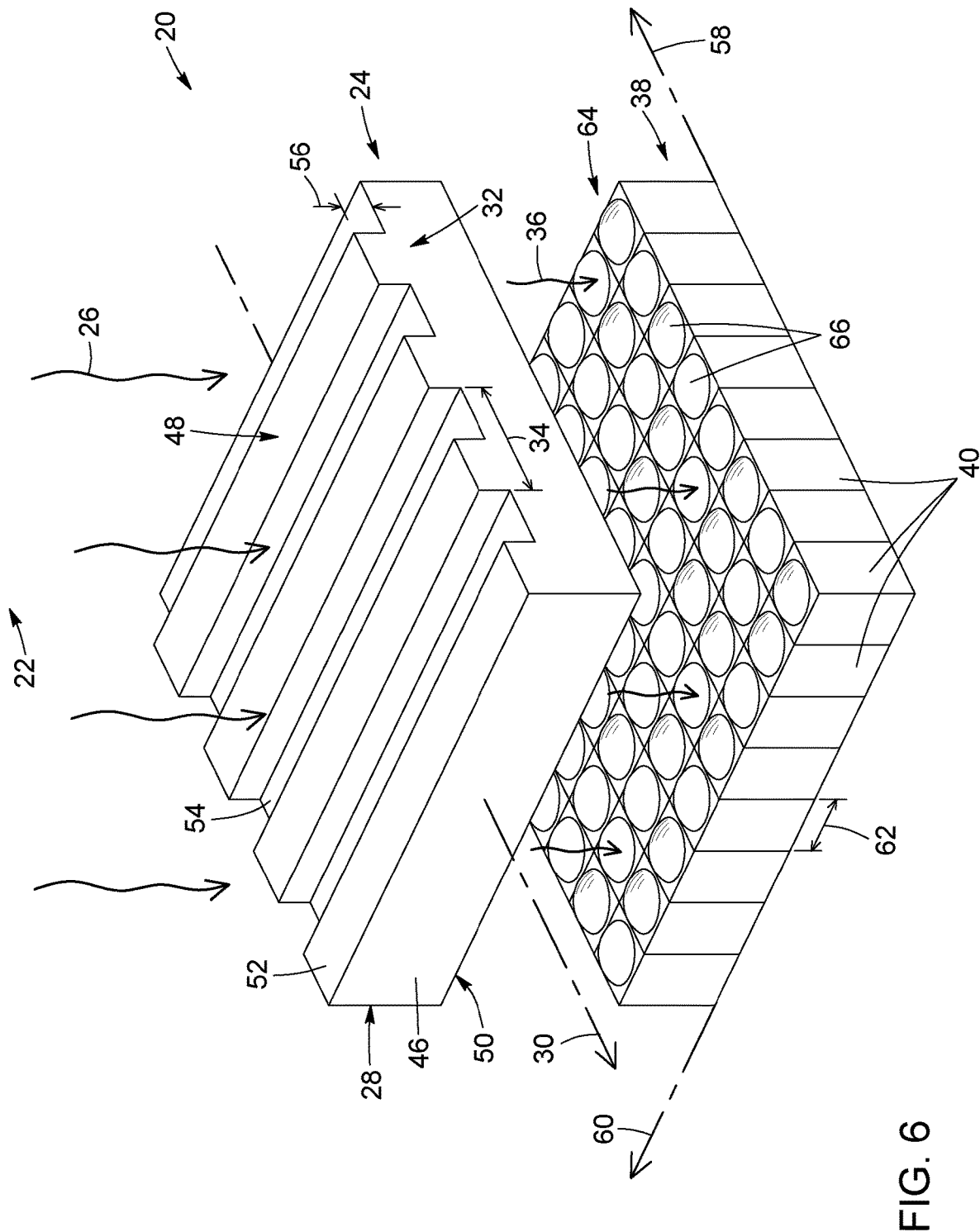
FIG. 6 is a schematic partially exploded perspective view of the light field imaging device, in accordance with another possible embodiment, where the light field imaging device includes a microlens array on top of the color filter array.

Referring to FIG. 6, there is shown another embodiment of a light field imaging device 20, which shares similar features with the embodiment of FIGS. 4 and 5, but differs in that it further includes a microlens array 64 disposed over the pixel array 38 and including a plurality of microlenses 66. Each microlens 66 is optically coupled to a corresponding one of the light-sensitive pixels 40 and is configured to focus the spatial part of the diffracted wavefront 36 incident upon it onto its corresponding light-sensitive pixel 40. It is to be noted that in embodiments where an array of color filters is provided, such as in FIGS. 1 and 2, the microlens array would be disposed over the color filter array such that each microlens would be optically coupled to a corresponding one of the color filters. In some variants, the light imaging device may also include an anti-reflection coating (not shown) provided over the pixel array 38.

Figure 7:
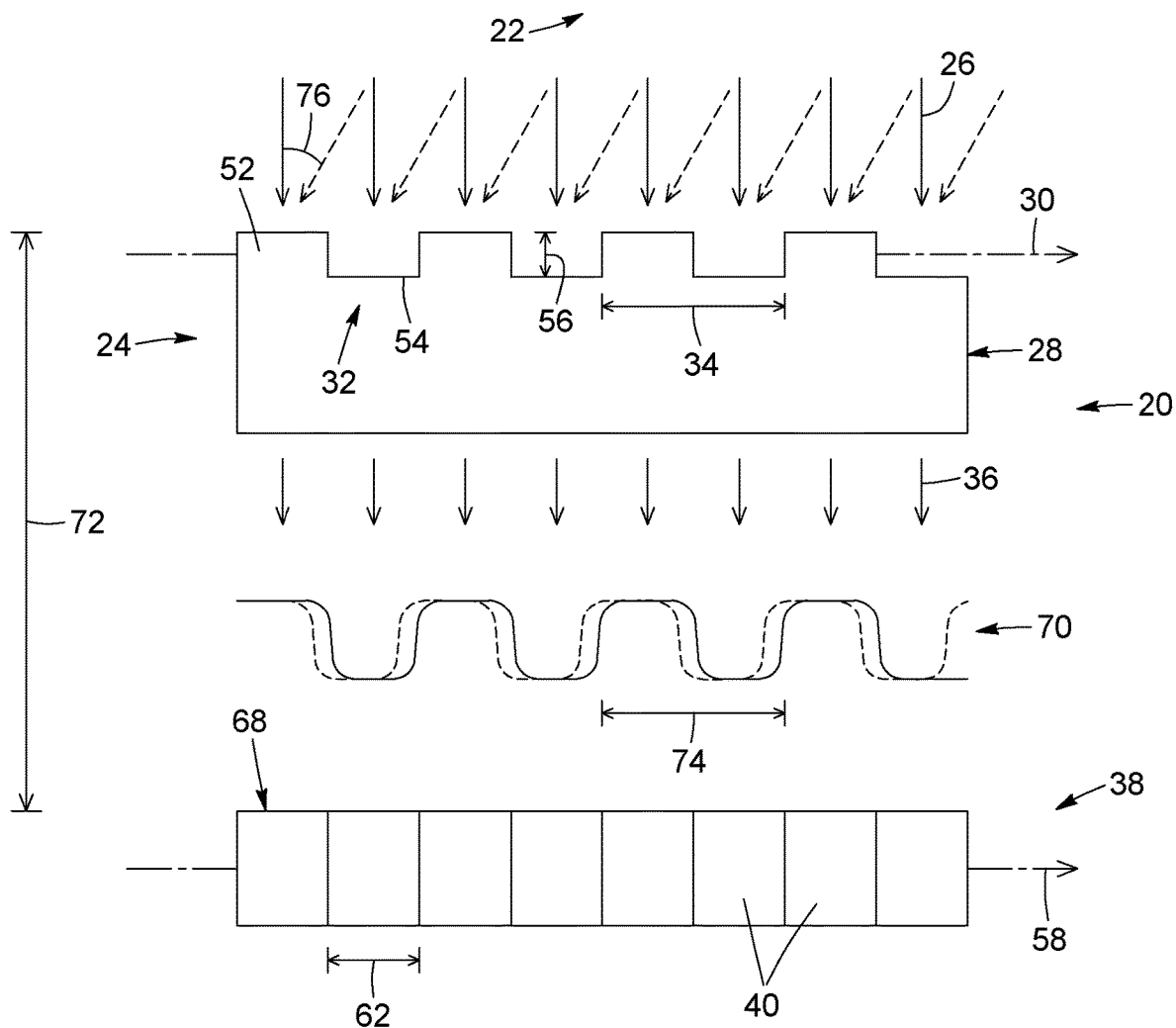
FIG. 7 is a schematic partially exploded side view of a light field imaging device, in accordance with another possible embodiment, where the propagation of a wavefront of light through the device is schematically depicted. The light field imaging device of FIG. 7 is suitable for monochrome imaging applications.

Referring now to FIG. 7, there is shown a schematic partially exploded side view of an embodiment of a light field imaging device 20 suitable for monochrome imaging applications. The light field imaging device 20 shares similarities with the one shown in FIGS. 4 and 5, in that it includes a diffraction grating 28 disposed on top of a pixel array 38 of light-sensitive pixels 40. The diffraction grating 28 is a binary phase transmission grating having a duty cycle of 50% and a periodic refractive index modulation pattern 32 consisting of alternating sets of ridges 52 and grooves 54. FIG. 7 also depicts schematically the propagation of light through the device 20. In operation, the light field imaging device 20 has a field of view encompassing an observable scene 22. The diffraction grating 28 receives an optical wavefront 26 (solid line) incident from the scene 22 on its input side, and diffracts the optical wavefront 26 to generate, on its output side, a diffracted wavefront 36 (solid line) that propagates toward the pixel array 38 for detection thereby. For simplicity, the incoming optical wavefront 26 in FIG. 7 corresponds to the wavefront of a plane wave impinging on the diffraction grating 28 at normal incidence. However, the present techniques can be implemented for an optical wavefront of arbitrary shape incident on the diffraction grating 28 at an arbitrary angle within the field of view of the light field imaging device.

Referring still to FIG. 7, the diffracted wavefront 36 can be characterized by a diffraction pattern whose form is a function of the geometry of the diffraction grating 28, the wavelength and angle of incidence of the optical wavefront 26, and the position of the observation plane, which corresponds to the light-receiving surface 68 of the pixel array 38. In the observation plane, the diffraction pattern of the diffracted wavefront 36 can be characterized by a spatially varying intensity profile 70 along the grating axis 30 in the light-receiving surface 68 of the pixel array 38. It is to be noted that in FIG. 7, the grating axis 30 is parallel to the pixel axis 58.

In the present techniques, the diffraction grating 28 and the pixel array 38 are disposed relative to each other such that the light-receiving surface 68 of the pixel array 38 is positioned in the near-field diffraction region, or simply the near field, of the diffraction grating 28. In the near-field diffraction regime, the Fresnel diffraction theory can be used to calculate the diffraction pattern of waves passing through a diffraction grating. Unlike the far-field Fraunhofer diffraction theory, Fresnel diffraction accounts for the wavefront curvature, which allows calculation of the relative phase of interfering waves. Similarly, when detecting the diffracted irradiance pattern within a few integer multiples of the wavelength with a photosensor or another imaging device of the same dimensional order as the grating, higher order-diffractive effects tend to be limited simply by spatial sampling. To detect the diffracted wavefront 36 in the near field, the present techniques can involve maintaining a sufficiently small separation distance 72 between the top surface 48 of the diffraction grating 28, where refractive index modulation pattern 32 is formed and diffraction occurs, and the light-receiving surface 68 of the underlying pixel array 38, where the diffracted wavefront 36 is detected. In some implementations, this can involve selecting the separation distance 72 to be less than about ten times a center wavelength of the optical wavefront 26. In some implementations, the separation distance 72 can range between about 0.5 μm and about 20 μm, for example between 0.5 μm and about 8 μm if the center wavelength of the optical wavefront lies in the visible range.

In the near-field diffraction regime, the intensity profile 70 of the diffracted wavefront 36 produced by a periodic diffraction grating 28 generally has a spatial period 74 that substantially matches the grating period 34 of the diffraction grating 28 as well as a shape that substantially matches the refractive index modulation pattern 32 of the diffraction grating 28. For example, in the illustrated embodiment, the diffraction pattern of the diffracted wavefront 36 detected by the light-sensitive pixels 40 of the pixel array 38 has a square-wave, or two-step, intensity profile 70 that substantially matches that of the refractive index modulation pattern 32 of the binary phase diffraction grating 28. In the present description, the term "match" and derivatives thereof should be understood to encompass not only an "exact" or "perfect" match between the intensity profile 70 of the detected diffracted wavefront 36 and the periodic refractive index modulation pattern 32 of the diffraction grating 28, but also a "substantial", "approximate" or "subjective" match. The term "match" is therefore intended to refer herein to a condition in which two features are either the same or within some predetermined tolerance of each other.

Another feature of near-field diffraction by a periodic diffraction grating is that upon varying the angle of incidence 76 of the incoming optical wavefront 26 on the diffraction grating 28, the intensity profile 70 of the diffracted wavefront 36 is laterally shifted along the grating axis 30, but substantially retains its period 74 and shape, as can be seen from the comparison between solid and dashed wavefront lines in FIG. 7. It will be understood that in some implementations, the separation distance between the diffraction grating 28 and the pixel array 38 can be selected to ensure the spatial shift experienced by the intensity profile 70 of the diffracted wavefront 36 remains less than the grating period 34 as the angle of incidence 76 of the optical wavefront 26 is varied across the angular span of the field of view of the light field imaging device 20. Otherwise, ambiguity in the angle of incidence 76 of the optical wavefront 26 can become an issue. For example, consider for illustrative purposes, a light field imaging device 20 whose field of view has an angular span of ±20° and in which varying the angle of incidence 76 of the incoming optical wavefront 26 by 10° produces a spatial shift of the intensity profile 70 of the diffracted wavefront 36 equal to the grating period 34. In such a case, light incident on the diffraction grating 34 with an incidence angle of, for example, +2° would be undistinguishable, from phase information alone, from light incidence on the diffraction grating 34 with an incidence angle of +12°.

It is also to be noted that upon being optically coupled to an underlying pixel array 38, the diffraction grating 28 convolves lights phase information with a standard 2D image, so that the intensity profile 70 of the diffraction pattern of the detected diffracted wavefront 36 can generally be written as a modulated function I~$I_{mod}$(depth info)×$I_{base}$ (2D image) including a modulating component $I_{mod}$ and a base component $I_{base}$. The base component $I_{base}$ represents the non-phase-dependent optical wavefront that would be detected by the pixel array 38 if there were no diffraction grating 28 in front of it. In other words, detecting the base component-base alone would allow a conventional 2D image of the scene 22 to be obtained. Meanwhile, the modulating component $I_{mod}$, which is generally small compared to the base component $I_{base}$ (e.g., ratio of $I_{mod}$ to $I_{base}$ ranging from about 0.1 to about 0.3), is a direct result of the phase of the incident optical wavefront 26, so that any edge or slight difference in incidence angle will manifest itself as a periodic electrical response spatially sampled across the pixel array 38. It will be understood that the sensitivity to the angle of incidence 76 of the optical wavefront 26, and therefore the angular resolution of the light field imaging device 20, will generally depend on the specific design of the diffraction grating 28.

Referring still to FIG. 7, as mentioned above, in the present techniques, the pixel array 38 has a pixel pitch 62 along the grating axis 30 that is smaller than the grating period 34 of the diffraction grating 28. This means that when the light-receiving surface 68 of the pixel array 38 is in the near field of the diffracting grating 28, the pixel pitch 62 of the pixel array 38 along the grating axis 30 is also smaller than the spatial period 74 of the intensity profile 70 along the grating axis 30 of the detected diffracted wavefront 36. It will be understood that when this condition is fulfilled, a complete period of the intensity profile 70 of the detected diffracted wavefront 36 will be sampled by at least two adjacent pixel banks of the pixel array 38, each of these pixel banks sampling a different spatial part of the intensity profile 70 over a full cycle. In the present description, the term "pixel bank" refers to a group of light-sensitive pixels of the pixel array that are arranged along a line which is perpendicular to the grating axis of the overlying diffraction grating. That is, two adjacent pixel banks are separated from each other by a distance corresponding to the pixel pitch along the grating axis. For example, in FIG. 7, each pixel bank of the pixel array 38 extends parallel to the pixel axis 60 oriented perpendicular to the plane of the page.

It will be understood that depending on the application, the ratio R of the grating period 34 of the diffraction grating 28 to the pixel pitch 62 of the pixel array 38 along the grating axis 30 can take several values. In some implementations, the ratio R can be equal to or greater than two (i.e., R≥2); or equal to a positive integer greater than one (i.e., R=(n+1), where n={1, 2, . . . }); or equal to an integer power of two (i.e., R=2n, where n={1, 2, . . . }); or the like. In some implementations, it may be beneficial or required that the grating period 34 be not only larger than, but also not too close to the pixel pitch 62 along the grating axis 30. For example, in some implementations, it may be advantageous that the grating period 34 be at least about twice the underlying pixel bank pitch 62 to allow for each pair of adjacent pixel banks to sufficiently subsample the resultant modulated diffracted wavefront 36, whose spatial modulation rate is dictated by the properties of the diffraction grating 28, near or at Nyquist rate. This Nyquist, or nearly Nyquist, subsampling can allow for the direct removal of the modulating component $I_{mod}$ from the measured signal I by standard signal processing techniques. Once removed, the modulating signal $I_{mod}$ may be manipulated independently of the base component $I_{base}$. In some implementations, undersampling effects can arise if the pixel pitch 62 along the grating axis 30 is not sufficiently smaller than the grating period 34. In such scenarios, it may become useful or even necessary to alter the grating design to provide two different sub-gratings with a sufficient relative phase offset between them to allow for signal subtraction.

For example, in the illustrated embodiment of FIG. 7, the ratio R of the grating period 34 to the pixel pitch 62 along the grating axis 30 is substantially equal to two. It will be understood that in such a case, adjacent pixel banks will sample complimentary spatial phases of the intensity profile 70 of the detected diffracted wavefront 36, that is, spatial parts of the intensity profile 70 that are phase-shifted by 180° relative to each other. This can be expressed mathematically as follows: $|\phi_{bank\ n+1} - \phi_{bank,n}| = \pi$, where $\phi_{bank,n+1}$ and $\phi_{bank,n}$ are the spatial phases of the intensity profile 70 measured by the $(n+1)^{th}$ and the $n^{th}$ pixel banks of the pixel array 38, respectively. Such a configuration can allow for a direct deconvolution of the modulating component $I_{mod}$ and the base component $I_{base}$ through the subsampling of the interference pattern resulting from the incident wave fronts interaction:

$$I_{base} = I(\text{bank}_n) + I(\text{bank}_{n+1}), \tag{3}$$

$$I_{mod} = I(\text{bank}_n) - I(\text{bank}_{n+1}). \tag{4}$$

Figure 8A:
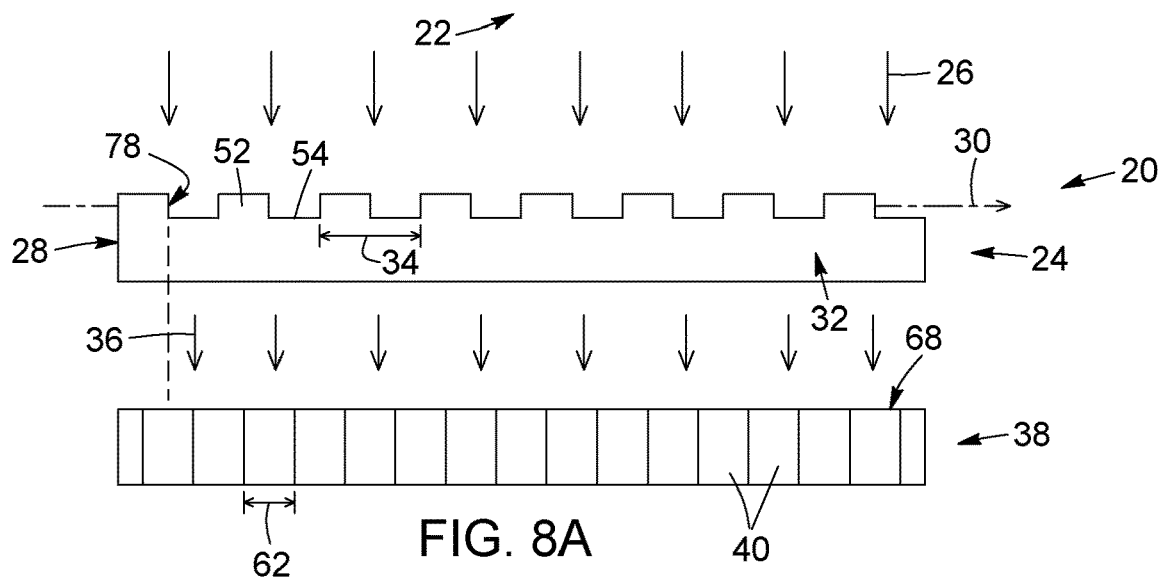
FIGS. 8A to 8C are schematic partially exploded side views of three other possible embodiments of a light field imaging device, where the propagation of a wavefront of light through the device is schematically depicted.
Figure 8B:
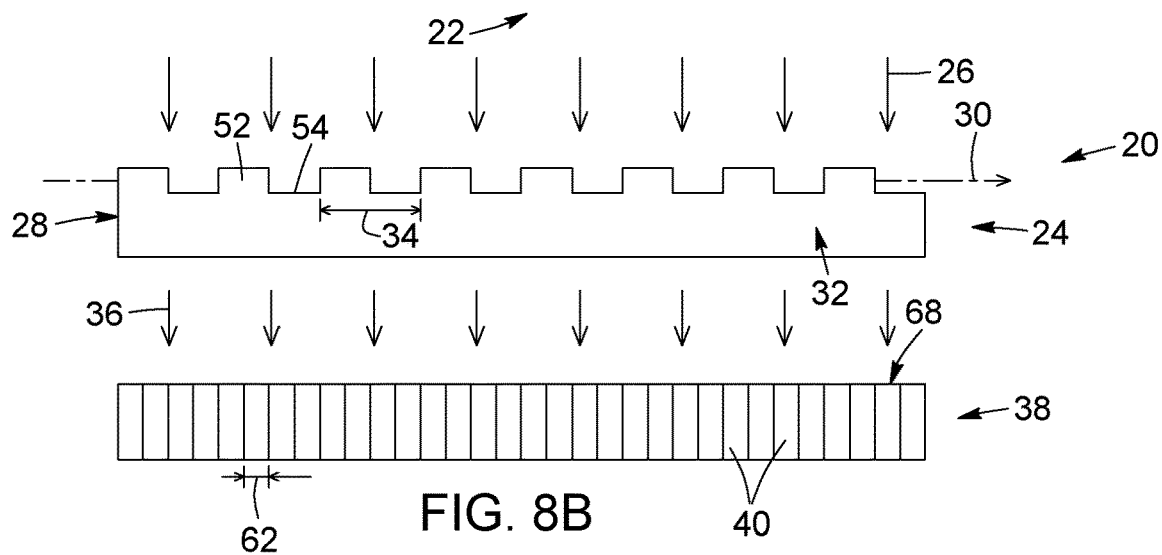
Figure 8C:
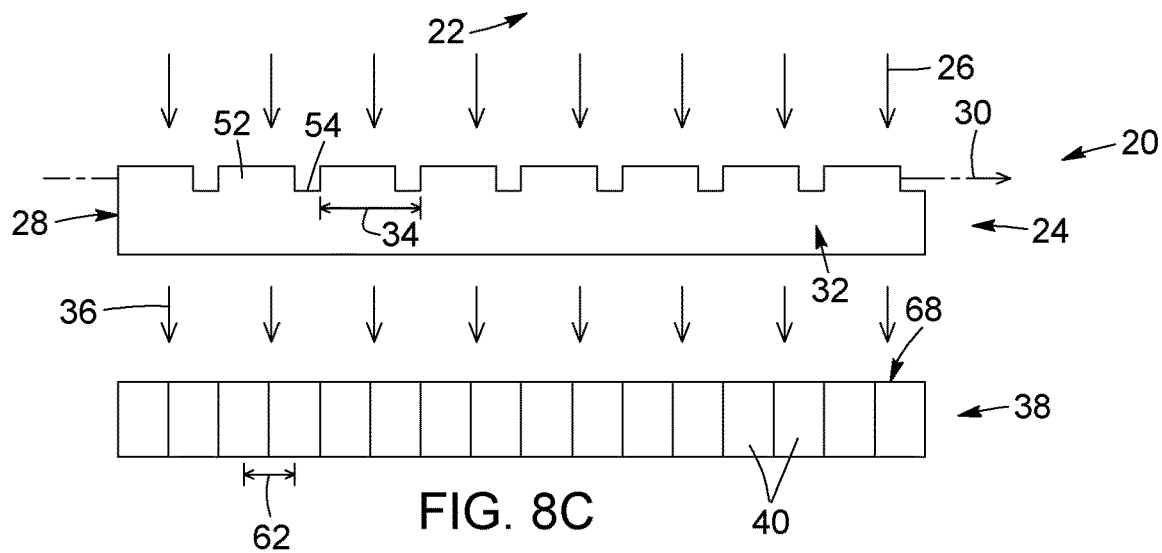

Referring still to FIG. 7, in the illustrated embodiment, the diffraction grating 28 has a duty cycle of 50% (i.e., ridges 52 and grooves 54 of equal width), and each light-sensitive pixel 40 is positioned under and in vertical alignment with either a corresponding one of the ridges 52 or a corresponding one of the grooves 54. However, other arrangements can be used in other embodiments, non-limiting examples of which are shown in FIGS. 8A to 8C. First, in FIG. 8A, the diffraction grating 28 has a duty cycle of 50%, but is laterally shifted by a quarter of the grating period 34 compared to the embodiment FIG. 7. As a result, each light-sensitive pixel 40 is positioned under and in vertical alignment with a transition 78 between a corresponding one of the ridges 52 and a corresponding adjacent one of the grooves 54. Second, in FIG. 8B, the diffraction grating 28 has a duty cycle of 50%, but compared to the embodiment of FIG. 7, the ratio R of the grating period 34 to the pixel pitch 62 along the grating axis 30 is equal to four rather than two. There are therefore two light-sensitive pixels 40 under each of the ridges 52 and each of the grooves 54. Finally, in FIG. 8C, the ratio R of the grating period 34 to the pixel pitch 62 along the grating axis 30 is equal to two, as in FIG. 7, but the duty cycle of the diffracting grating is different from 50%.

In some implementations, for example in backside-illuminated architectures with high chief-ray angle optical systems, the diffraction grating may be designed to follow the designed chief-ray-angle offset of the microlens array relative to their light-sensitive pixel so that each corresponding chief ray will pass through the center of the intended grating feature and its subsequent microlens. Such a configuration can ensure appropriate phase offsets for highly constrained optical systems. This means that, in some embodiments, the degree of vertical alignment between the features of the diffraction grating (e.g., ridges and grooves) and the underlying light-sensitive pixels can change as a function of position within the pixel array, for example as one goes from the center to the edge of the pixel array, to accommodate a predetermined chief-ray-angle offset. For example, in some regions of the pixel array, each light-sensitive pixel may be positioned directly under a groove or a ridge of the diffraction grating, while in other regions of the pixel array, each light-sensitive pixel may extend under both a portion of a ridge and a portion of a groove.

Figure 9A:
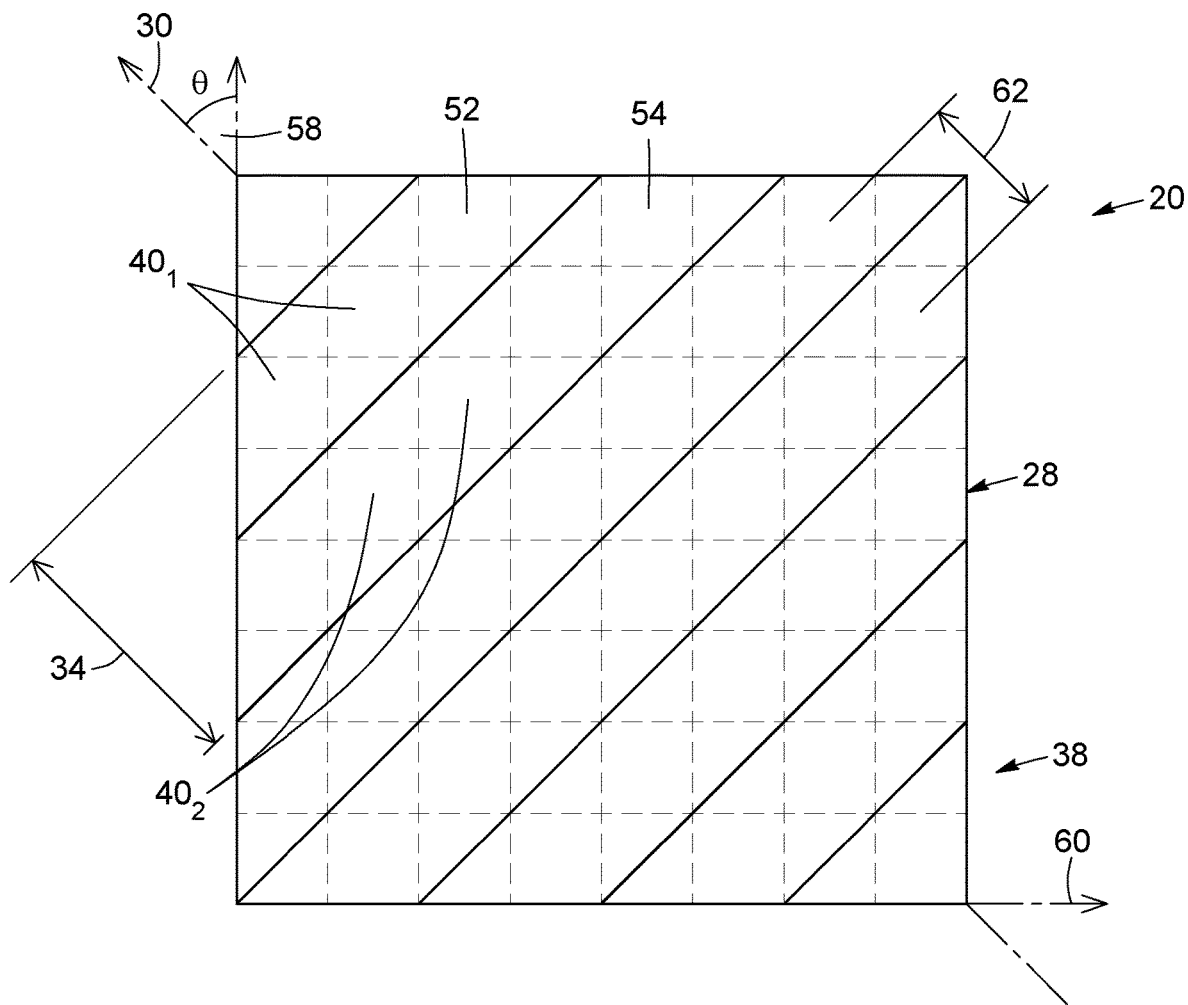
FIGS. 9A and 9B are schematic partially transparent top views of two other possible embodiments of a light field imaging device, where the grating axis of the diffraction grating is oblique to either of the two orthogonal pixel axes.
Figure 9B:
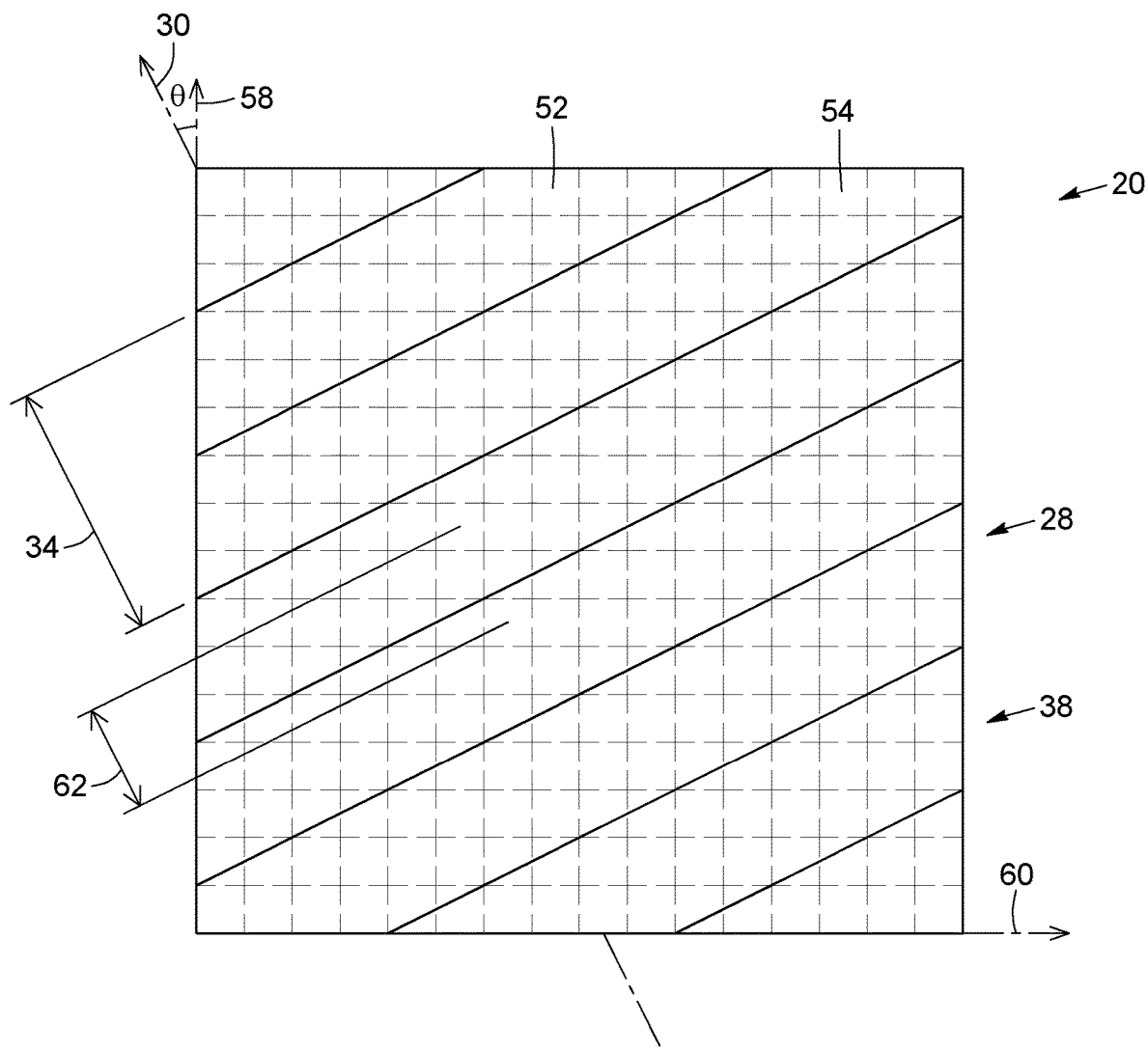

In the implementations of FIGS. 7 and 8A to 80, the diffraction grating 28 is oriented with respect to the underlying pixel array 38 so that the grating axis 30 is parallel to one of the two orthogonal pixel axes 58, 60 (and thus perpendicular to each other). However, referring to FIGS. 9A and 9B, there are illustrated two other possible embodiments in which the grating axis 30 is oblique to both the two orthogonal pixel axes 58, 60. This is, in FIG. 9A, the grating axis 30 is oriented at an angle θ=45° with respect to each one of the pixel axes 58, 60, while in FIG. 9B, the grating axis is oriented at angle θ=26.565° with respect to the pixel axis 58. It is to be noted that in the oblique configurations illustrated in FIGS. 9A and 9B, the pixel pitch 62 along the grating axis 30 remains smaller than the grating period. It is also to be noted that pixel banks such as defined above, that is, groups of pixels arranged along a line transverse to the grating axis 30 of the overlying diffraction grating 28 can also be defined in oblique configurations. For example, FIG. 9A includes a first group of pixels 40i that belong to a first pixel bank located under ridge 52, and a second group of pixels 402 that belongs to a second pixel bank located an adjacent groove 54.

Figure 10:
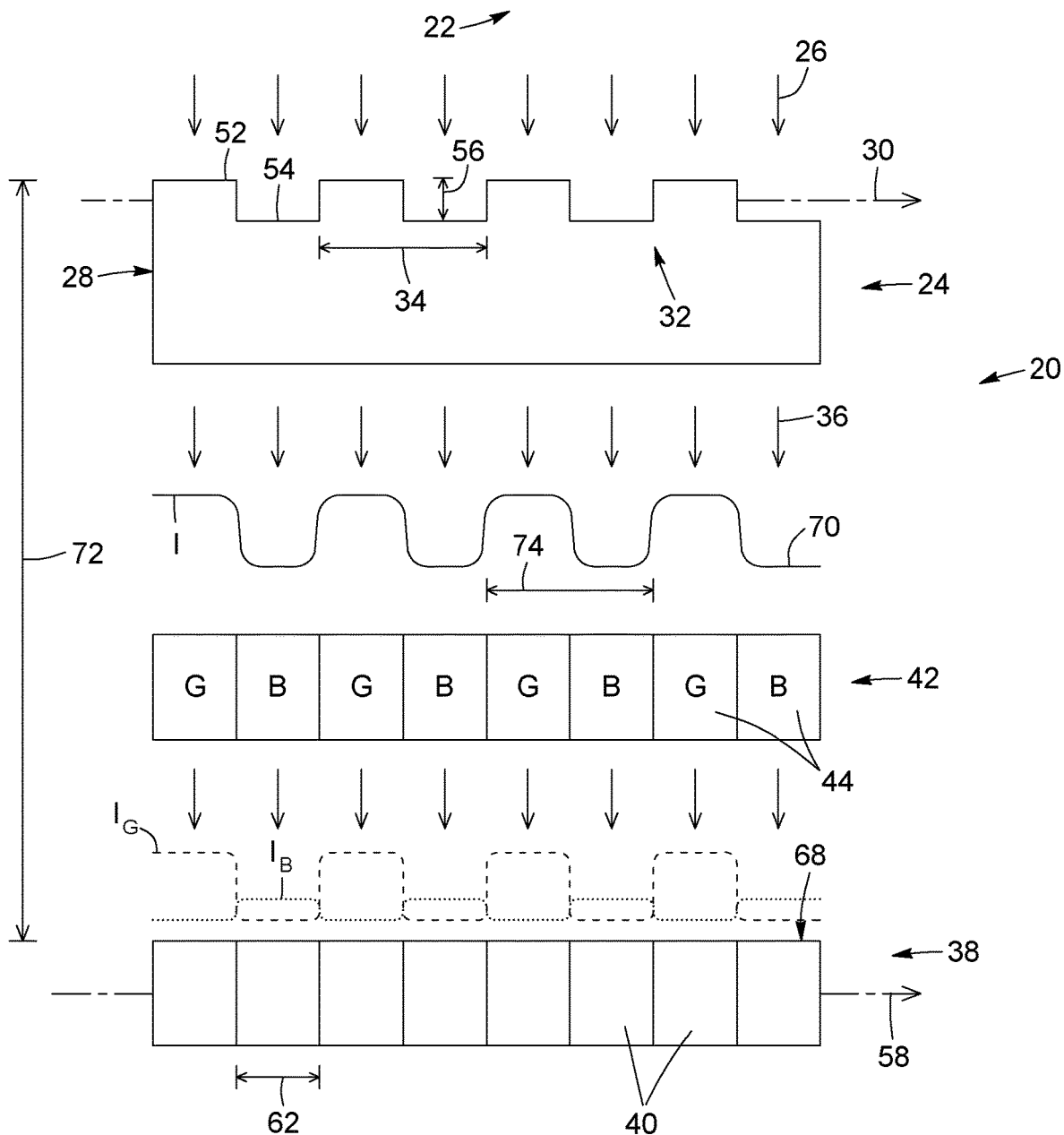
FIG. 10 is a schematic partially exploded side view of a light field imaging device, in accordance with another possible embodiment, where the propagation of a wavefront of light through the device is schematically depicted. The light field imaging device of FIG. 10 is suitable for color imaging applications.

Referring now to FIG. 10, there is shown a schematic partially exploded side view of an embodiment of a light field imaging device 20 suitable for color imaging applications. The light field imaging device 20 shares similarities with the one shown in FIGS. 1 and 2, in that it includes a diffraction grating 28 disposed on top of a color filter array 42, which is itself disposed on top of a pixel array 38 of light-sensitive pixels 40. The diffraction grating 28 is a binary phase transmission grating having a duty cycle of 50% and a periodic refractive index modulation pattern 32 consisting of alternating sets of ridges 52 and grooves 54. The color filter array 42 has a Bayer pattern, of which FIG. 10 depicts a row of alternating green (G) and blue (B) filters. FIG. 10 also depicts schematically the propagation of light through the device 20. In operation, the diffraction grating 28 receives and diffracts an optical wavefront 26 originating from the scene 22 to generate a diffracted wavefront 36. For simplicity, it is assumed that the diffraction grating 28 of FIG. 10 is achromatic in the spectral range encompassing green and blue light. The color filter array 42 receives and spatio-spectrally filters the diffracted wavefront 36 prior to its detection by the underlying pixel array 38. The operation of the light field imaging device 20 is therefore based on a directly spatio-and-chromatically sampled diffracted wavefront 36 enabled by the provision of a periodic diffraction grating 28 deposed on top of a sensor structure including a color filter array 42 and an underlying pixel array 38.

As in FIG. 7, the diffracted wavefront 36 produced by the diffraction grating 28 in FIG. 10 defines a diffraction pattern characterized by a spatially varying intensity profile 70 along the grating axis 30. Also, the diffraction grating 28 and the pixel array 38 are disposed relative to each other such that the light-receiving surface 68 of the pixel array 38 is positioned in the near field of the diffraction grating 28, where the spatial period 74 of the intensity profile 70 of the detected diffracted wavefront 36 substantially matches the grating period 34 of the diffraction grating 28.

It will be understood that the intensity profile 70 of the diffracted wavefront 36 that is detected by the pixel array 38 after spatio-spectral filtering by the color filter array 42 is a combination or superposition of the portions of the diffracted wavefront 36 filtered by the red filters, the portions of the diffracted wavefront 36 filtered by the green filters, and the portions of the diffracted wavefront 36 filtered by the blue filters. As such, using a standard RGB Bayer pattern as an example, the modulating component $I_{mod}$ and the base component $I_{base}$ of the intensity profile/can be split into their respective color components as follows:

$$I_R \sim I_{mod,R}(\text{depth info}) \times I_{base,R}(2D \text{ image}), \tag{5}$$

$$I_G \sim I_{mod,G}(\text{depth info}) \times I_{base,G}(2D \text{ image}), \tag{6}$$

$$I_B \sim I_{mod,B}(\text{depth info}) \times I_{base,B}(2D \text{ image}). \tag{7}$$

In FIG. 10, the intensity profiles $I_G$ and $I_8$ are depicted in dashed and dotted lines, respectively.

As in FIG. 7, the ratio R of the grating period 34 of the diffraction grating 28 to the pixel pitch 62 of the pixel array 38 along the grating axis 30 is equal to two in the embodiment of FIG. 10, and the relationship $|<I>_{bank,n+i} - <I>_{bank,n}| = \pi$ introduced above applies. In a standard RGB Bayer pattern, the red and blue filters are always located in adjacent pixel banks in a Bayer pattern, the signals $I_R$ and $I_B$, which are associated with the sparsely sampled red and blue components, will be in antiphase relative to each other. Meanwhile, because green filters are present in all pixel banks, the signal $I_G$, which is associated with the densely sampled green components, will contain both in-phase and out-of-phase contributions.

Figure 11:
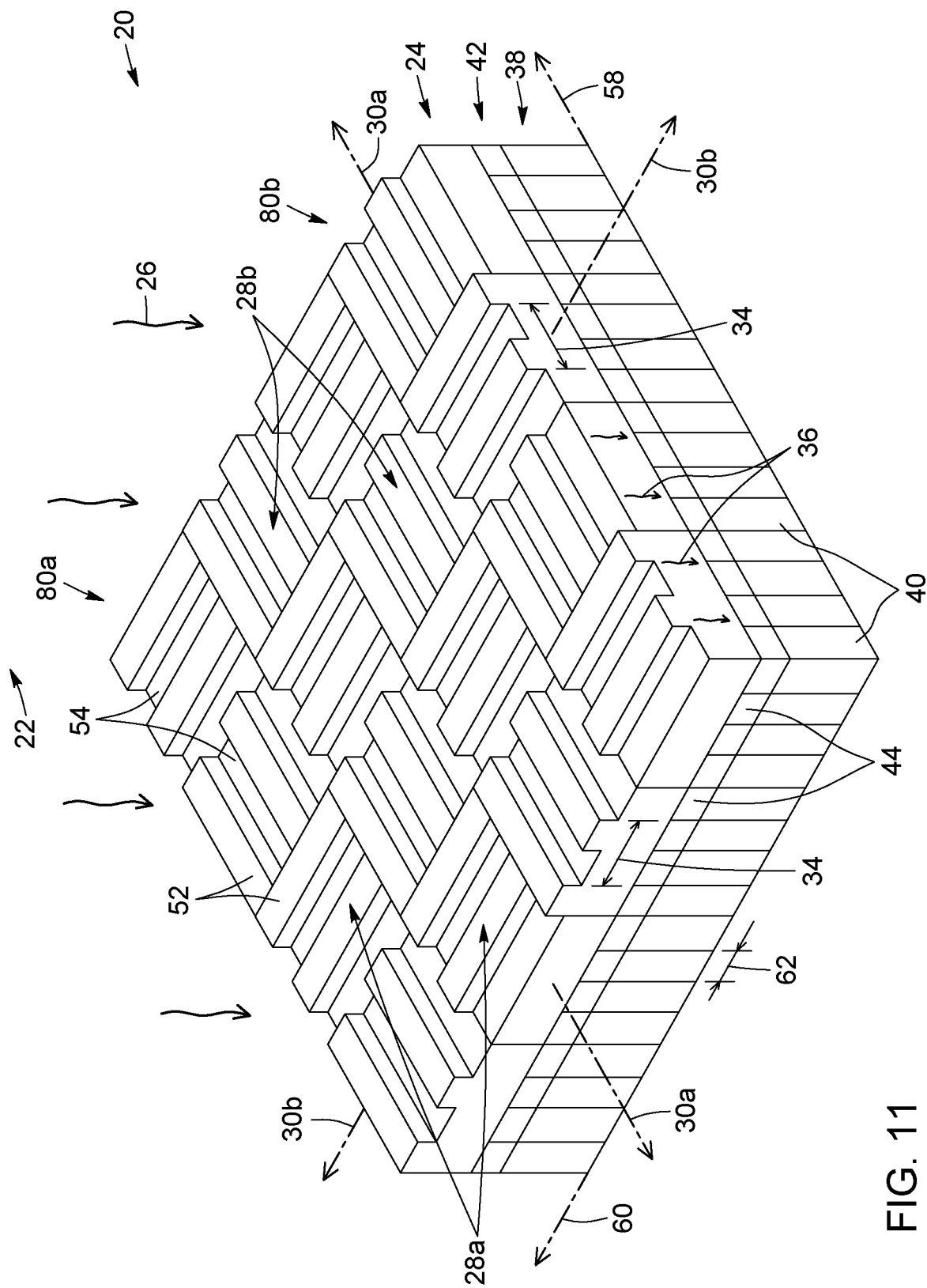
FIG. 11 is a schematic perspective view of a light field imaging device, in accordance with another possible embodiment, where the diffracting grating assembly includes two sets of orthogonally oriented diffracting gratings arranged to alternate in both rows and columns to define a checkerboard pattern.

In the implementations described so far, the diffraction grating assembly was depicted as including only one diffracting grating. However, referring to FIG. 11, in other implementations, the diffraction grating assembly 24 includes a plurality of diffracting gratings 28a, 28b, where the diffracting gratings 28a, 28b are arranged in a two-dimensional grating array disposed over the color filter array 42. In FIG. 11, the diffracting grating assembly 24 includes sixteen diffraction gratings, but this number is provided for illustrative purposes and could be varied in other embodiments. For example, depending on the application, the number of diffraction gratings 28a, 28b in the diffraction grating assembly 24 can range from one to up to millions (e.g., a 20-megapixel pixel array 38 could have up to 2.8 million diffraction gratings on top of it). It is to be noted that other than their grating axis orientation, every diffraction grating 28 of the diffraction grating assembly 24 depicted in FIG. 11 is a binary phase grating including alternating sets of parallel ridges 52 and grooves 54 having the same duty cycle of 50%, the same grating period 34, and the same number of repetitions of the grating period 34, although in other embodiments each of these parameters can be varied from one diffraction grating 28 to the another. More particularly, each one of the diffraction gratings 28 in FIG. 11 includes two repetitions of the grating period 34. However, it will be understood that this number can be varied depending on the application, for example between two and ten repetitions in some embodiments.

In some implementations, the plurality of diffraction gratings 28 includes multiple sets 80a, 80b of diffraction gratings 28, where the grating axes 30a, 30b of the diffraction gratings 28 of different ones of the sets 80a, 80b have different orientations. For example, in FIG. 11, the multiple sets 80a, 80b consist of a first set 80a of diffraction gratings 28 and a second set 80b of diffraction gratings 28, the grating axes 30a of the diffraction gratings 28 of the first set 80a extending substantially perpendicularly to the grating axes 30b of the diffraction gratings 28 of the second set 80b. The first grating axes 30a are parallel to the first pixel axis 58, while the second grating axes 30b are parallel to the second pixel axis 60. In the illustrated embodiment, the diffraction gratings 28 of the first set 80a and second set 80b are arranged to alternate in both rows and columns, resulting in a checkerboard pattern. Of course, any other suitable regular or irregular arrangement, pattern or mosaic of orthogonally oriented gratings can be envisioned in other embodiments. For example, the orthogonally oriented gratings could be arranged to alternate only in rows or only in columns or arranged randomly. Furthermore, other embodiments can include more than two sets of diffraction gratings, which may or may not be orthogonal with respect to one another. For example, in some implementations, the diffraction grating assembly can include up to 24 different sets of diffraction gratings.

It will be understood that providing a diffraction grating assembly with diffracting gratings having different grating axis orientations can be advantageous or required in some implementations since diffraction occurs along the grating axis of an individual diffraction grating. This means that when only a single grating orientation is present in the diffraction grating assembly, light coming from objects of the scene that extend perpendicularly to this single grating orientation will not be diffracted. In some implementations, providing two sets of orthogonally oriented gratings (e.g., horizontally and vertically oriented gratings) can be sufficient to capture sufficient light field image data about the scene. The concept of using diffraction grating assemblies with two or more grating orientations can be taken to the limit of completely circular diffraction gratings having increasing periodicity radially form the center, which would provide a near perfect Fourier plane imager.

Figure 12A:
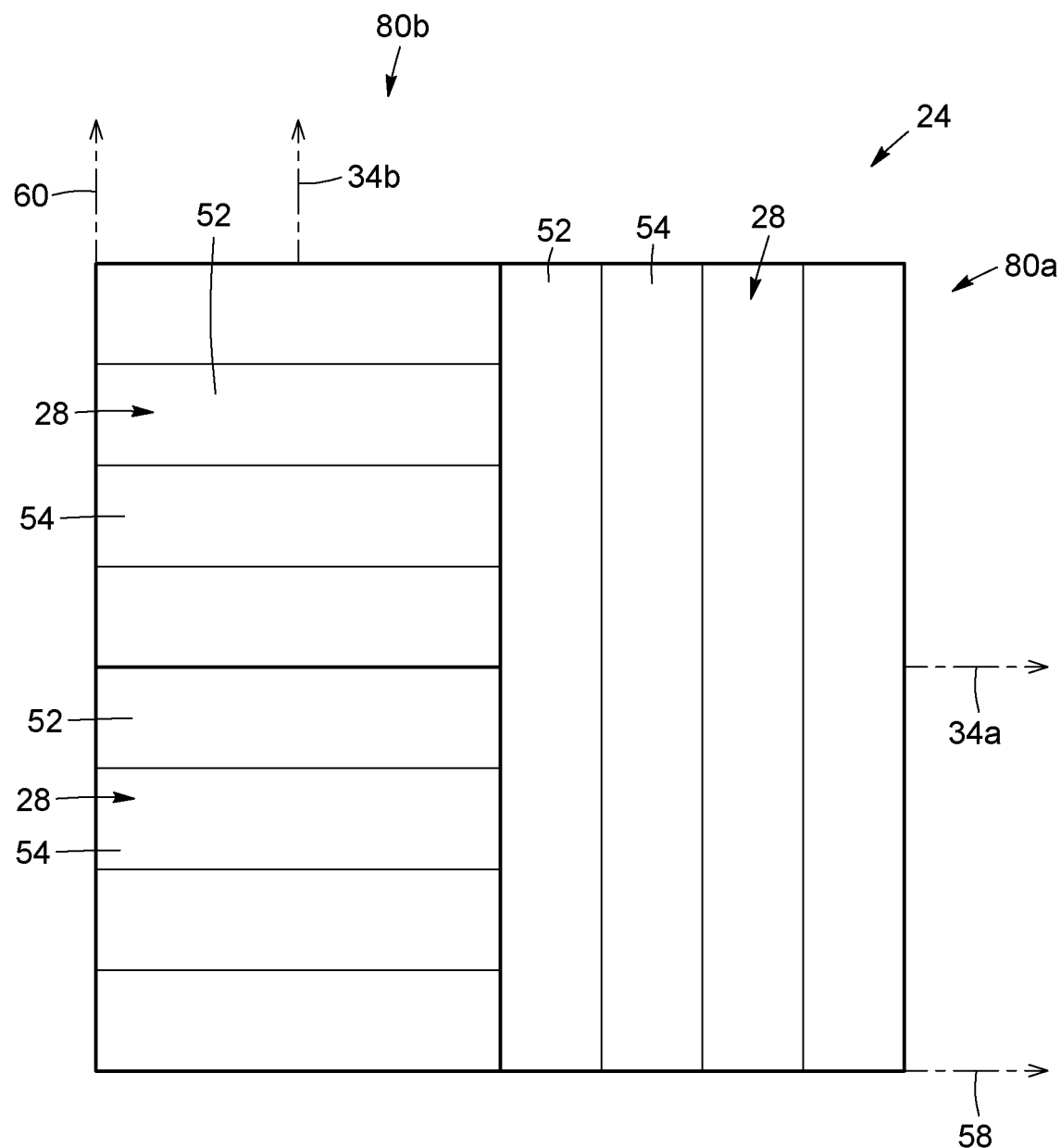
FIGS. 12A to 12C illustrate alternative embodiments of diffraction grating assemblies including a plurality of diffraction gratings arranged in a two-dimensional array.
Figure 12B:
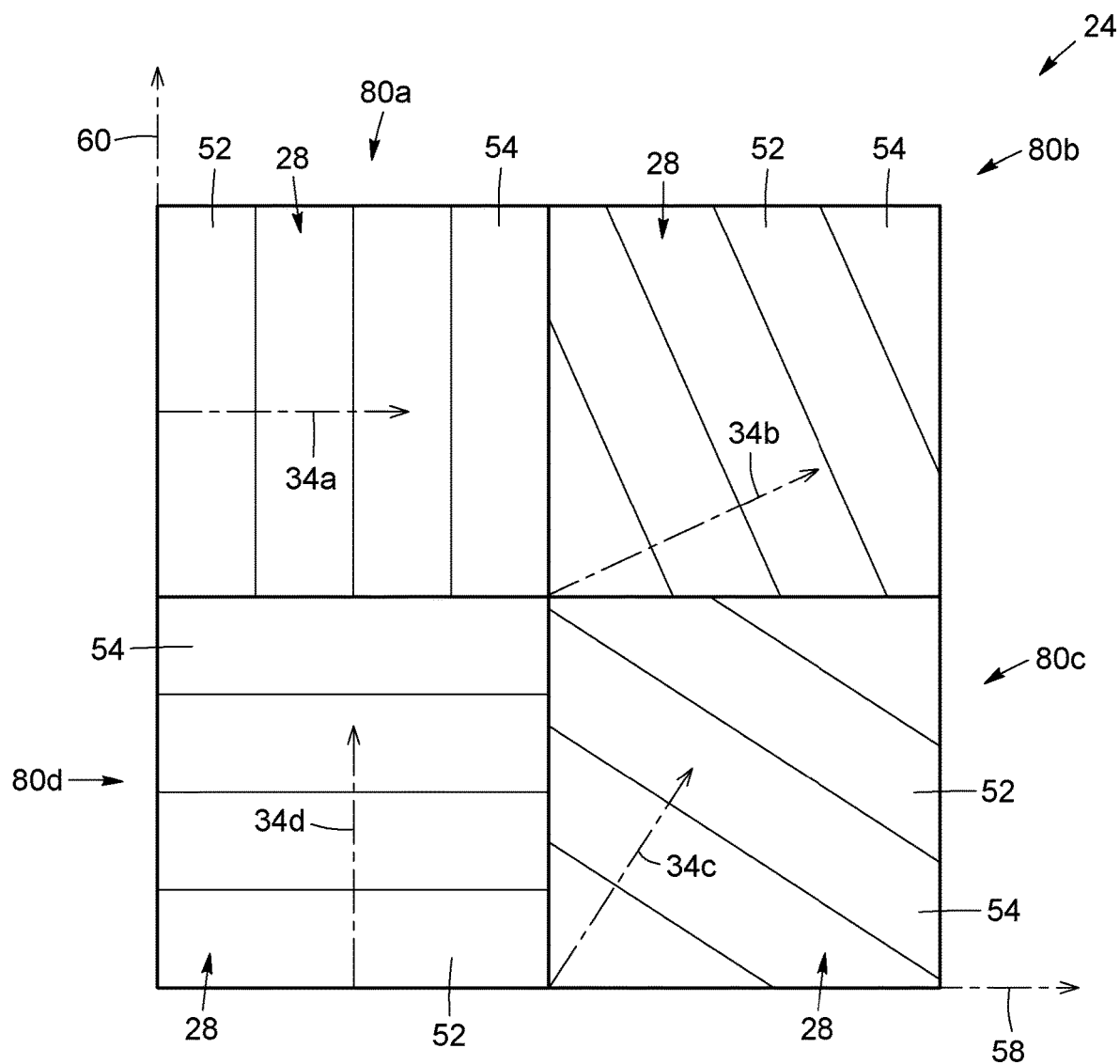
Figure 12C:
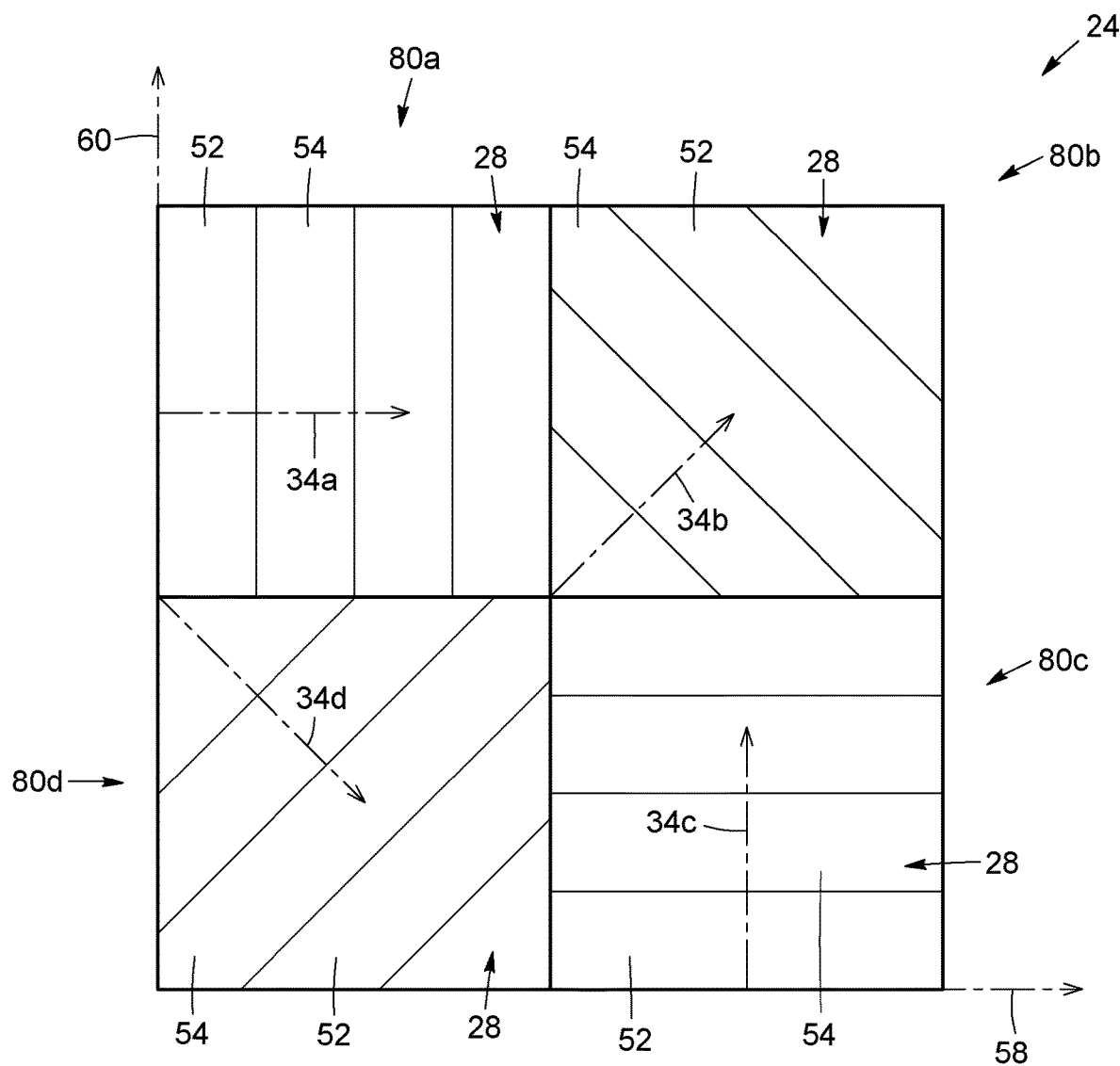

Referring to FIGS. 12A to 12C, there are illustrated other examples of grating arrangements in diffraction grating assemblies including a plurality of diffraction gratings. In FIG. 12A, the diffraction grating assembly 24 includes two sets 80a, 80b of orthogonally oriented diffraction gratings 28 that alternate only in columns. The grating axis orientation of one set 80a is along one pixel axis 58, and the grating axis orientation of the other set 80b is along the other pixel axis 60. In FIG. 12B, the diffraction grating assembly 24 includes four sets 80a to 80d of diffraction gratings 28 whose grating axes 34a to 34d are oriented at 0°, 33°, 66° and 90° with respect to the horizontal pixel axis 58. In FIG. 12C, the diffraction grating assembly 24 includes four sets 80a to 80d of diffraction gratings 28 whose grating axes 34a to 34d are oriented at 0°, 45°, 90° and −45° with respect to the horizontal pixel axis 58. It will be understood that in each of FIGS. 12A to 12C, the depicted diffraction gratings 28 can represent a unit cell of the diffraction grating assembly 24, which is repeated a plurality of times.

Figure 13:
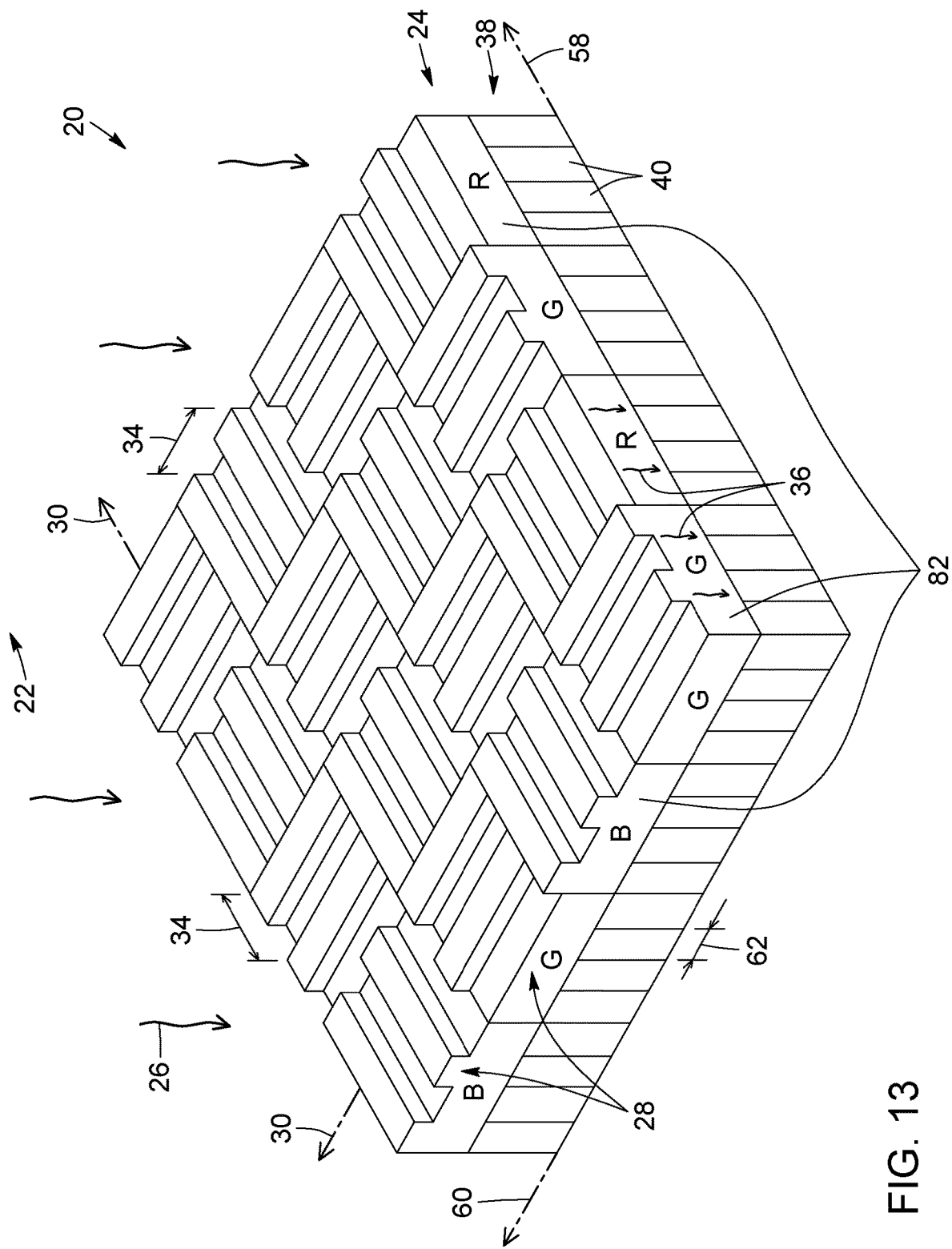
FIG. 13 is a schematic perspective view of a light field imaging device, in accordance with another possible embodiment, where the diffracting grating assembly includes a plurality of diffraction gratings forming an array of color filters, each of which embodied by a respective one of the diffraction gratings.

Referring now to FIG. 13, there is shown an embodiment of a light field imaging device 20 that is suitable for color-based applications, but does not include a color filter array disposed between the diffraction grating assembly 24 and underlying pixel array 38. Rather, in the illustrated embodiment, the diffraction grating assembly 24 includes an array of diffraction gratings 28, each of which includes a grating substrate 46 having a refractive index modulation pattern 32 formed thereon (e.g., made of alternating series of ridges 52 and grooves 54). The grating substrate 46 of each diffraction grating 28 also includes a spectral filter material or region 82 configured to spectrally filter the diffracted wavefront 36 prior to its detection by the plurality of light-sensitive pixels 40. In some implementations, each one of the diffraction grating 28 can be made of a material tailored to filter a desired spectral component, for example by incorporating a suitable dye dopant in the grating substrate 46.

Referring still to FIG. 13, the plurality of diffraction gratings 28 of the diffraction grating assembly 24 thus forms a color filter array in which each color filter is embodied by a corresponding one of the diffraction gratings 28. In other words, each one of the diffraction gratings 28 can be individually designed and tailored so that it forms to its own respective color filter in the color filter array. In FIG. 13, the color filter array formed by the plurality of diffraction gratings 28 is arranged in a Bayer pattern, so that the grating substrate 46 of each diffraction grating 28 acts as a red pass filter, a green pass filter or a blue pass filter. Of course, the color filter array defined by the plurality of diffraction gratings 28 can be operated outside the visible region of the electromagnetic spectrum and its mosaic color pattern is not limited to Bayer-type patterns, but can be applied to any appropriate mosaic color pattern, including those listed above.

In some implementations, the light field imaging device can include wavefront conditioning optics in front of the diffraction grating. The wavefront conditioning optics can be configured to collect, direct, transmit, reflect, refract, disperse, diffract, collimate, focus or otherwise act on the optical wavefront incident from the scene prior to it reaching the diffraction grating assembly. The wavefront conditioning optics can include lenses, mirrors, filters, optical fibers, and any other suitable reflective, refractive and/or diffractive optical components, and the like. In some implementations, the wavefront conditioning optics can include focusing optics positioned and configured to modify the incident wavefront in such a manner that it may be sampled by the light field imaging device.

Figure 14:
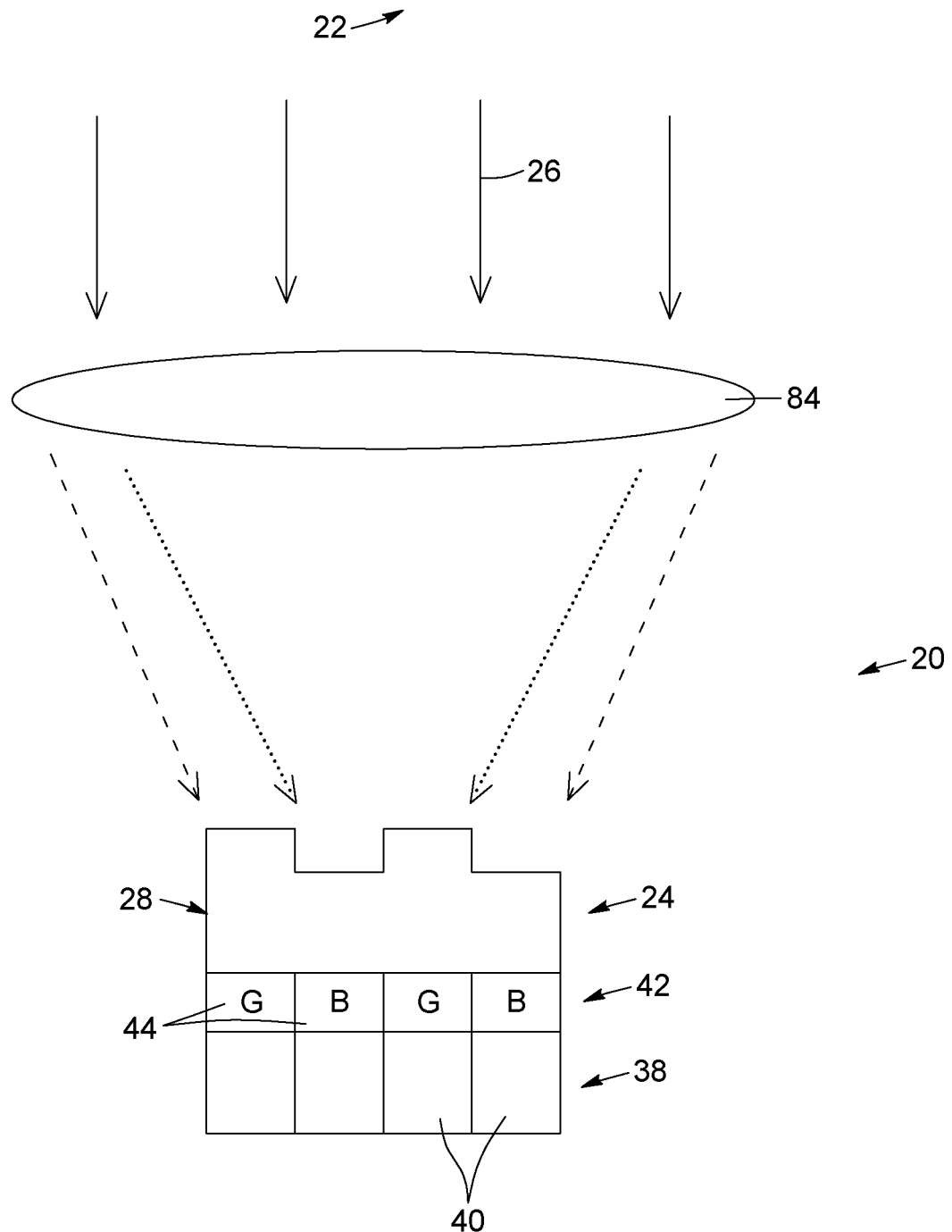
FIG. 14 is a schematic side view of a light field imaging device, in accordance with another possible embodiment, where the light field imaging device includes dispersive optics disposed in front of the diffraction grating assembly to spatio-spectrally spread the optical wavefront originating from the scene prior to it reaching the diffraction grating assembly.

Referring now to FIG. 14, another possible embodiment of a light field imaging device 20 is illustrated and includes dispersive optics 84 disposed in a light path of the optical wavefront 26 between the scene and the diffraction grating assembly. The dispersive optics 84 is configured to receive and disperse the incoming optical wavefront 26. The dispersive optics 84 can be embodied by any optical component or combination of optical components in which electromagnetic beams are subject to spatial spreading as a function of wavelength as they pass therethrough (e.g., by chromatic aberration). In the embodiment of FIG. 14, the dispersive optics 84 is a focusing lens, for simplicity. However, it will be understood that, in other embodiments, the dispersive optics 84 can be provided as an optical stack including a larger number of optical components (e.g., focusing and defocusing optics) that together act to disperse the optical wavefront 26 before it impinges on the diffraction grating assembly 24 (e.g., due to their intrinsic chromatic aberration).

For exemplary purposes, it is assumed in FIG. 14 that the optical wavefront 26 originating from the scene 22 is a superposition of waves containing multiple wavelengths of light, for example a green component (dashed line) and a blue component (dotted line). Each color components of the optical wavefront 26, by the nature of its energy-dependent interaction with the dispersive optics 84, will follow a slightly different optical path, leading to a chromatic dependence in the phase-shift introduced by the diffraction grating 28. In other words, the chromatic spread of the optical wavefront 26, as sampled through the angle-dependent diffraction produced by the diffractive grating 28, can provide coarse depth information about the optical wavefront 26. In such scenarios, the finer details of the depth information can be obtained from a comparative analysis of the modulating components $I_{mod,R}$ and $I_{mod,B}$, which are phase-shifted relative to each other due to their optical path differences, as sampled by the color filter array 42.

It is to be noted that in the case of monochromatic plane optical wavefront impinging on a focusing lens such as shown in FIG. 14, the focusing lens gradually refracts and focuses the wavefront as it traverses the lens. It will be understood that the cross-sectional area of the wavefront reaching the diffraction grating assembly will be larger if the diffraction grating assembly is located out (either before or after) of the focal plane of the focusing lens that if it is located in the focal plane. Accordingly, the diffracted wavefront will be sampled by a greater number of light-sensitive pixels in the out-of-focus than in the in-focus configuration.

Figure 15:
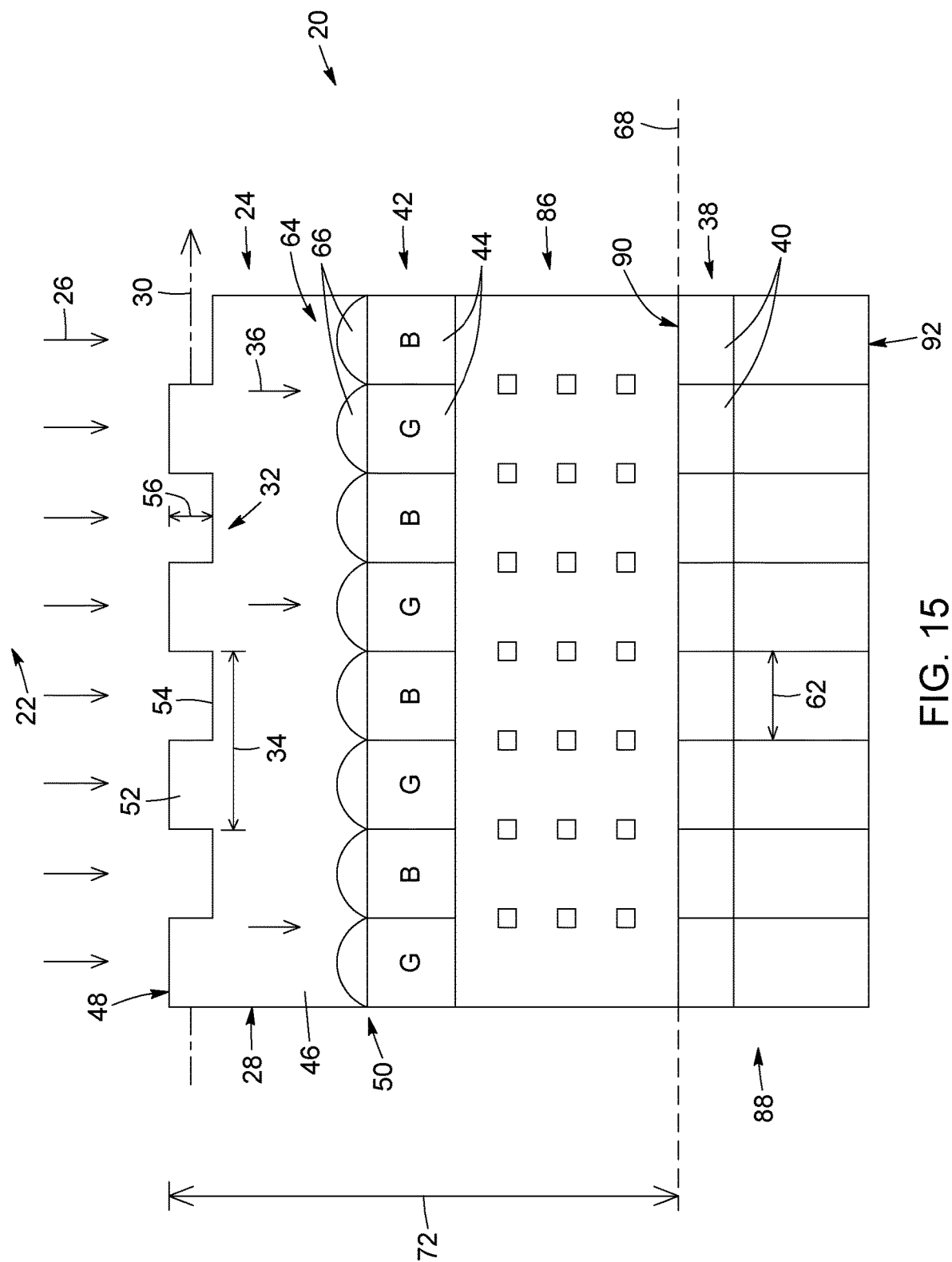
FIG. 15 is a schematic side view of a light field imaging device in a frontside illumination configuration, in accordance with another possible embodiment.
Figure 16:
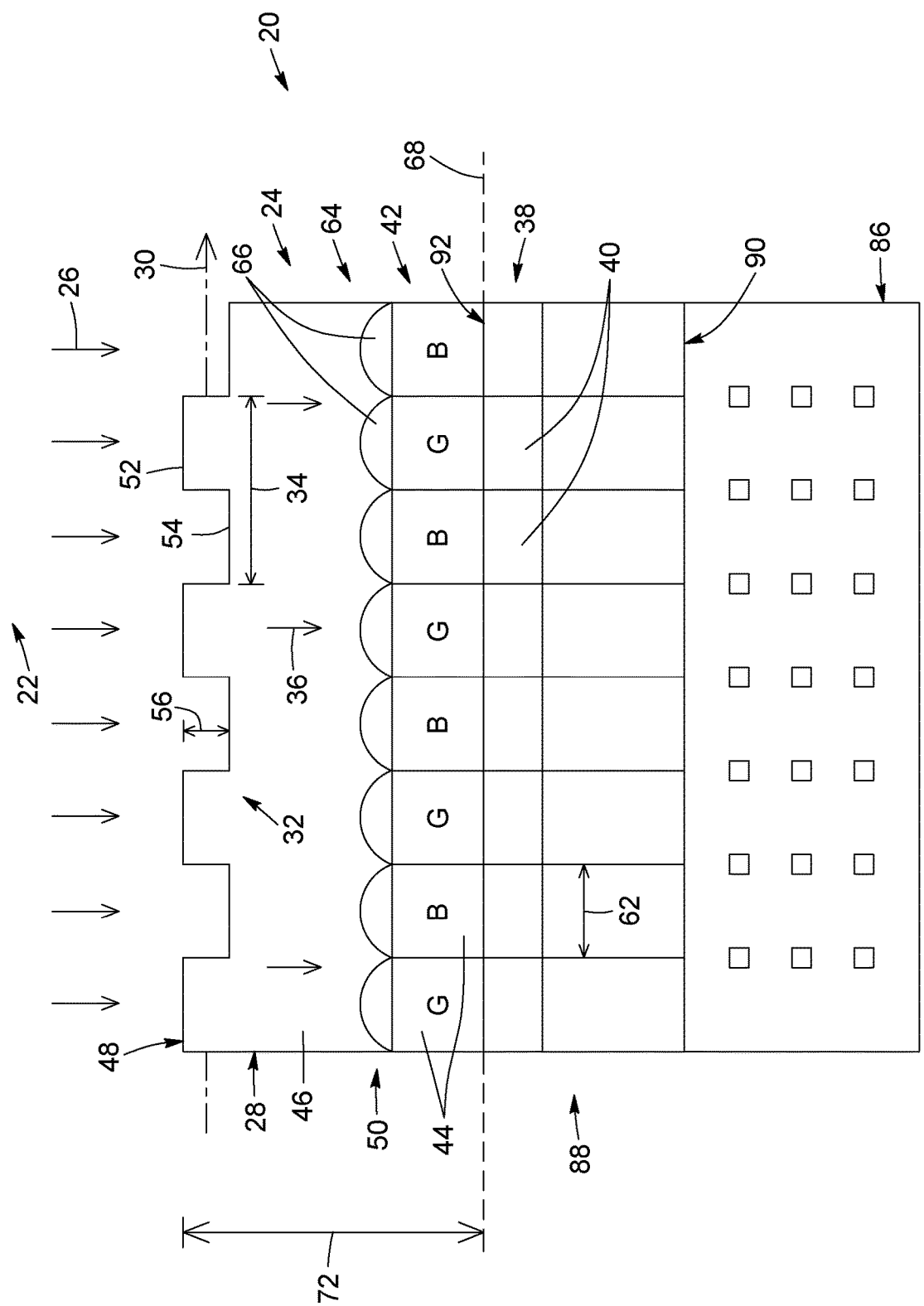
FIG. 16 is a schematic side view of a light field imaging device in a backside illumination configuration, in accordance with another possible embodiment.

Referring to FIGS. 15 and 16, in some implementations, the light field imaging device 20 can include pixel array circuitry 86 disposed either between the diffraction grating assembly and the pixel array, in a frontside illumination configuration (FIG. 15), or under the pixel array 38, in a backside illumination configuration (FIG. 16). More particularly, the diffraction grating assembly 24 can be directly etched into overlying silicon layers in the case of a frontside illumination architecture (FIG. 15), or placed directly atop the microlens array 64 and the color filter array 42 in the case of a backside illumination architecture (FIG. 16). In frontside illumination technology, the pixel array circuitry 86 includes an array of metal wiring (e.g., a silicon layer hosting a plurality of metal interconnect layers) connecting the color filters 44 to their corresponding light-sensitive pixels 40. Meanwhile, backside illumination technology provides opportunities for directly sampling the diffracted wavefront 36 produced by diffraction of an optical waveform 26 by the diffraction grating assembly 24. As light does not have to pass through the array of metal wiring of the pixel array circuitry 86 before reaching the pixel array 38, which otherwise would result in a loss of light, more aggressive diffraction grating designs with increased periodicity can be implemented. Also, the shorter optical stack configuration, as shown in FIG. 16, can allow for the diffraction grating assembly 24 to be positioned in much closer proximity to the light-receiving surface 68 of the pixel array 38, thereby decreasing the risk of higher-order diffractive effects which could cause undesirable cross-talk between pixel banks. Similarly, the decreased pixel size can allow for direct subsampling of the diffraction grating by the existing imaging wells.

Referring now more specifically to FIG. 16, there is shown a backside-illuminated light field imaging device 20 for capturing light field image data about a scene 22. The device 20 includes a substrate 88 having a front surface 90 and a back surface 92; a diffraction grating assembly 24 disposed over the back surface 92 of the substrate 88 and configured to receive an optical wavefront 26 originating from the scene 22; a pixel array 38 formed in the substrate 88; and pixel array circuitry 86 disposed under the front surface 90 and coupled to the pixel array 38. The diffraction grating assembly 24 includes at least one diffraction grating 28 having a grating axis 30 and a refractive index modulation pattern 32 having a grating period 34 along the grating axis 30. The diffraction grating 28 diffracts the optical wavefront 26 to generate a diffracted wavefront 36. The pixel array 38 includes a plurality of light-sensitive pixels 40 configured to receive, through the back surface 92, and detect, as the light field image data, the diffracted wavefront 36. As mentioned above, the pixel array 38 has a pixel pitch 62 along the grating axis 30 that is smaller than the grating period 34. As mentioned above, an advantage of backside illumination sensor technology in the context of the present techniques is that the diffraction grating assembly 24 can be positioned closer to the light-receiving surface 68 of the pixel array 38 than in frontside illumination applications. For example, in some backside illumination implementations, a separation distance 72 between the refractive index modulation pattern 32 of the diffraction grating 28 and the light-receiving surface 68 of the pixel array 38 can range from about 0.5 µm to about 5 µm, for example between 1 and 3 µm.

In color imaging applications, the backside-illuminated light field imaging device 20 can include a color filter array 42 disposed over the back surface 92 and including a plurality of color filters 44 arranged in a mosaic color pattern, for example a Bayer pattern. The color filter array 42 spatially and spectrally filters the diffracted wavefront 36 according to the mosaic color pattern prior to its detection by the plurality of light-sensitive pixels 40. The device 20 also includes a microlens array 64 disposed over the color filter array 42 and including a plurality of microlenses 66, each of which is optically coupled to a corresponding one of the plurality of the color filters 44. In FIG. 16, the diffraction grating 28 also includes a grating substrate 46 including a top surface 48 having the refractive index modulation pattern 32 formed thereon and a bottom surface 50 disposed over the microlens array 64. It is to be noted that the diffraction grating assembly 24, the pixel array 38, the color filter array 42 and the microlens array 64 of the backside-illuminated light field imaging device 20 can share similar features to those described above.

It is to be noted that backside illuminated and stacked-architecture devices are often employed in situations where sensor footprint is an issue (e.g., smartphone modules, tablets, webcams) and are becoming increasingly complex in design. In some implementations, the present techniques involve positioning a diffraction grating assembly directly on top of an existing sensor architecture as an independent process. Therefore, using the present techniques with backside illumination sensor technology can represent a flexible opportunity for sensor-level depth sensing optics, as it does not require a complete sensor or packaging redesign as is the case for microlens or coded aperture approaches. Furthermore, the modest z-stack increase of the order of micrometers resulting from the integration of the diffraction grating assembly on top of the sensor can similarly simplify packaging requirements and implementation in the overall optical stack of the sensor module. Additionally, the backside illumination manufacturing process itself does not require a direct etch into existing silicon layers as would be the case in frontside illumination technology. It is to be noted that for backside-illuminated devices with larger pixel pitch values and certain frontside illuminated devices, the diffraction grating assembly itself can act as a color filter array (see, e.g., FIG. 13), which can reduce the manufacturing complexity and/or the overall height of the optical stack. It is also to be noted that the different layers of the light field imaging device may be stacked and spaced-apart according to geometrical parameters supporting the desired optical functionalities.

Diffraction Grating Assembly Implementations

Figure 17:
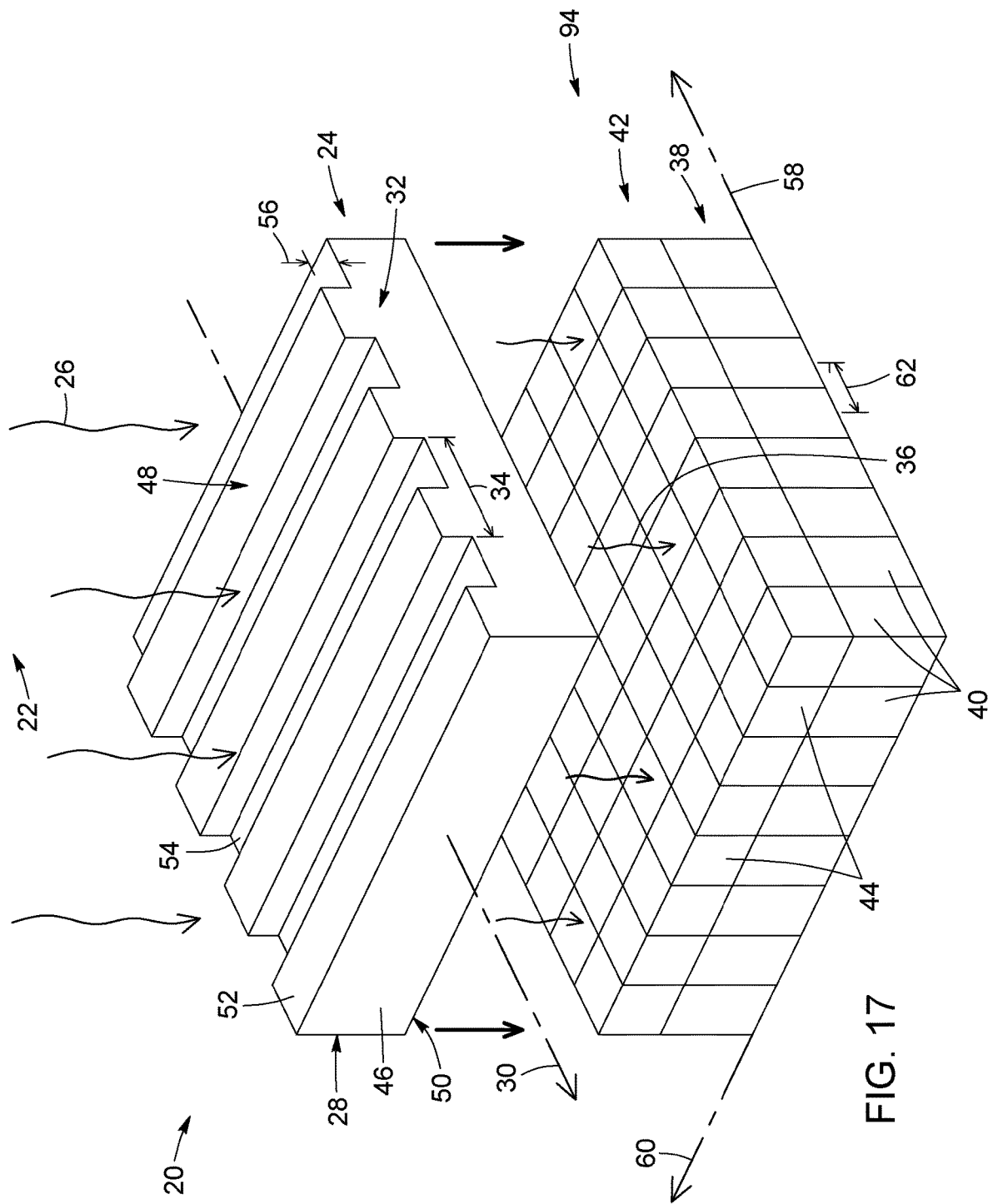
FIG. 17 is a schematic perspective view of a diffraction grating assembly for use in an image sensor including a pixel array having a plurality of light-sensitive pixels to capture light field image data about a scene, in accordance with a possible embodiment.

Referring to FIG. 17, in accordance with another aspect, the present description also relates to a diffraction grating assembly 24 for use with an image sensor 94 including a pixel array 38 having a plurality of light-sensitive pixels 40 to capture light field image data about a scene 22. The diffraction grating assembly 24, which is configured to be disposed over the pixel array 38, can share many similarities with those described above in the context of light field imaging device implementations, insofar as it includes a diffraction grating 28 having a grating axis 30 and a refractive index modulation pattern 32 having a grating period 34 along the grating axis 30, the grating period 34 being larger than a pixel pitch 62 of the pixel array 38 along the grating axis 30. For example, a ratio of the grating period 34 to the pixel pitch 62 along the grating axis 30 can be equal to two or an integer multiple of two. In some implementations, the diffraction grating 28 can be a binary phase grating and the refractive index modulation pattern 32 can include alternating ridges 52 and grooves 54. The diffraction grating 28 is configured to receive and diffract an optical wavefront 26 originating from the scene 22 to generate a diffracted wavefront 36 for detection by the light-sensitive pixels 40 as the light field image data. In some implementations intended for color imaging applications, the diffraction grating assembly 24 is configured to be disposed over a color filter array 42 of the image sensor 94. The color filter array 42 is disposed over pixel array 38 and configured to spatially and spectrally filter the diffracted wavefront 36 prior to its detection by the plurality of light-sensitive pixels 40.

Depending on the application, the diffraction grating assembly 24 can include a single diffraction grating 28 or a plurality of diffraction gratings 28 arranged in a two-dimensional grating array disposed over the pixel array 38.

Method Implementations

In accordance with another aspect, the present description also relates to various light field imaging methods, including a method of capturing light field image data about a scene as well as a method of providing 3D imaging capabilities to a conventional 2D image sensor. These methods can be performed with light field imaging devices and diffraction grating assemblies such as those described above, or with other similar devices and assemblies.

Figure 18:
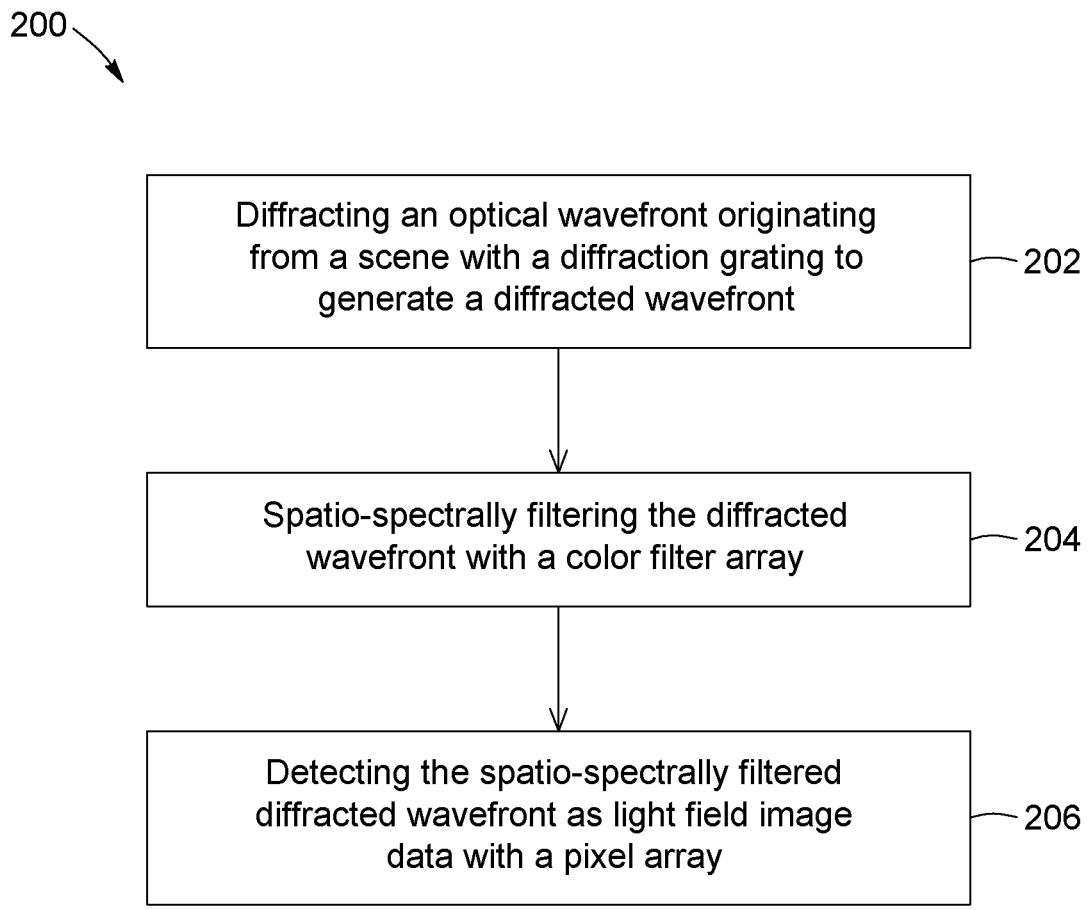
FIG. 18 is a flow diagram of a method of capturing light field image data about a scene, in accordance with a possible embodiment.

Referring to FIG. 18, there is provided a flow diagram of an embodiment of a method 200 of capturing light field image data about a scene. The method includes a step 202 of diffracting an optical wavefront originating from the scene with a diffraction grating. The diffraction grating has a grating axis and a grating period along the grating axis. The diffraction grating is configured to diffract the incident optical wavefront to generate a diffracted wavefront. The diffracted wavefront can be characterized by an intensity profile along the grating axis. In some implementations, the diffracting step 202 can include diffracting the optical wavefront in a waveband ranging from 400 nm (blue end of visible spectrum) to 1550 nm (telecommunication wavelengths), for example from 400 nm to 650 nm. In some implementations, the diffraction grating is one of a plurality of diffraction gratings that together form a diffraction grating assembly. In such implementations, the method 200 of FIG. 18 can be performed simultaneously for each diffraction grating of the diffraction grating assembly.

In some implementations, the method 200 can include a step of providing the diffraction grating as a phase grating, for example a binary phase grating. The binary phase grating can include alternating ridges and grooves periodically spaced-apart at the grating period. The method 200 can include a step of selecting the grating period in a range between 1 µm to 20 µm. The method 200 can also include a step of setting a step height of the ridges relative to the grooves to control an optical path difference between adjacent ridges and grooves. For example, in some implementations, the step height can be set to provide, at a given wavelength of the optical wavefront, a half-wave optical path difference between the ridges and the grooves. Of course, other values of optical path difference can be used in other implementations.

Referring still to FIG. 18, the method 200 also includes a step 204 of spatio-spectrally filtering the diffracted wavefront with a color filter array to produce a filtered wavefront. It is to be noted that this step 204 is optional and can be omitted in some implementations, for example in monochrome imaging applications.

The method 200 can further include a step 206 of detecting the spatio-spectrally filtered wavefront as the light field image data. The detecting step 206 can be performed with a pixel array comprising a plurality of light-sensitive pixels disposed under the color filter array. However, when the spatio-spectral filtering step 204 is omitted, there is no color filter array disposed between the diffraction grating assembly and the pixel array, and the detecting step 206 involves the direct detection of the diffracted wavefront with the plurality of light-sensitive pixels. As mentioned above with respect to device implementations, the grating period of the diffraction grating is selected to be larger than the pixel pitch of the pixel array along the grating axis. As also mentioned above, the separation distance between the top surface of the diffraction grating (i.e., the refractive index modulation pattern) and the light-receiving surface of the underlying pixel array is selected so that the filtered or diffracted wavefront is detected in a near-field diffraction regime, where the intensity profile of the diffracted wavefront along the grating axis has a spatial period that substantially matches the grating period. For example, in some implementations, the method can include a step of setting the separation distance to a value that is less than about ten times a center wavelength of the optical wavefront to detect the filtered or diffracted wavefront in the near field.

In some implementations, the diffraction grating can be provided with a duty cycle of about 50%, and the method 200 can include a step of positioning each light-sensitive pixel under and in alignment with either a ridge or a groove of the diffraction grating, or under and in alignment with a transition or boundary between a ridge and an adjacent groove. In some implementations, the method 200 can include a step of setting a ratio of the grating period to the pixel pitch along the grating axis to be substantially equal to two or an integer multiple of two.

Referring still to FIG. 18, in some implementations, the plurality of light-sensitive pixels can be arranged in a rectangular pixel grid defined by two orthogonal pixel axes, and the method 200 can include a step of orienting the grating axis either parallel to one of the two orthogonal pixel axes or oblique to both the two orthogonal pixel axes. For example, in some orthogonal implementations, one half of the diffraction gratings can be oriented along one pixel axis, and the other half can be oriented along the other pixel axis. One possible oblique configuration can include orienting the diffraction gratings at an angle of 45° with respect to each pixel axis.

In some implementations, the method 200 can further include an optional step of spectrally dispersing the optical wavefront prior to diffracting the optical wavefront.

Figure 19:
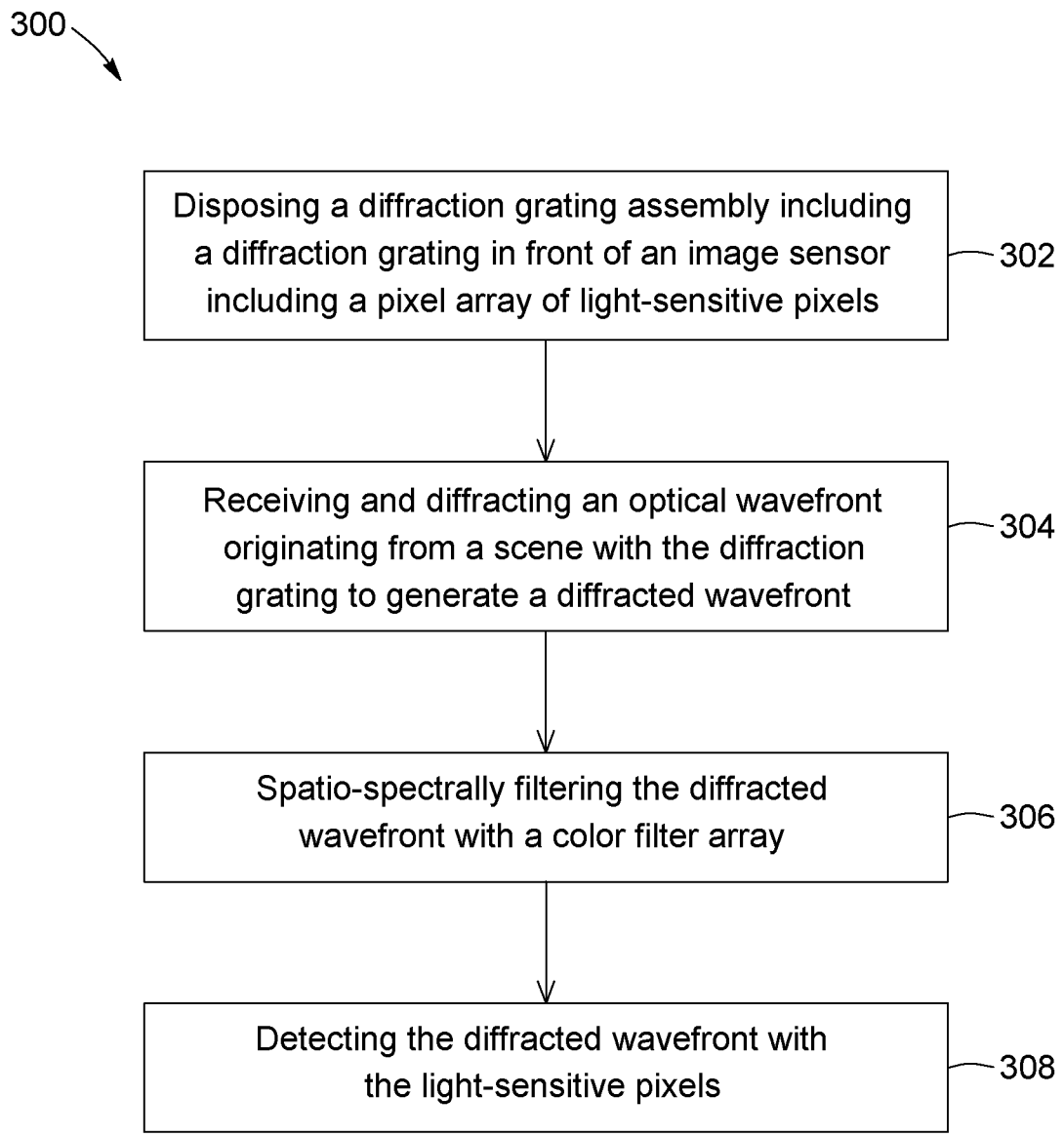
FIG. 19 is a flow diagram of a method of providing 3D imaging capabilities to an image sensor viewing a scene and including an array of light-sensitive pixels, in accordance with a possible embodiment.

Referring now to FIG. 19, there is provided a flow diagram of a method 300 of providing 3D imaging capabilities, for example depth mapping capabilities, to an image sensor viewing a scene and including a pixel array having a plurality of light-sensitive pixels. For example, the image sensor can be a conventional or custom-designed frontside- or backside illuminated CMOS or CCD sensor.

The method 300 includes a step 302 disposing a diffraction grating assembly in front of the image sensor. The diffraction grating assembly includes at least one diffraction grating, each of which having a grating axis and a grating period along the grating axis. The grating period is selected to be larger than a pixel pitch of the pixel array along the grating axis. For example, in some implementations, the grating period can be larger than the pixel pitch along the grating axis by a factor of two or more. In some implementations, the disposing step 302 can include positioning the diffraction grating assembly at a separation distance from the pixel array which is selected such that an optical path length of the diffracted wavefront prior to detection by the light-sensitive pixels is less than about ten times a center wavelength of the optical wavefront. Such a configuration allows detection of the diffracted wavefront in a near-field diffraction regime. In some implementations, the disposing step 320 can include orienting the grating axis either parallel to one of two orthogonal pixel axes of the pixel array or oblique (e.g., at 45°) to the pixel axes.

In some implementations, the method 300 can include a step of providing the diffraction grating as a phase grating, for example a binary phase grating. The binary phase grating can include a series of ridges periodically spaced-apart at the grating period, interleaved with a series of grooves also periodically spaced-apart at the grating period. The method 300 can include a step of selecting the grating period between 1 µm to 20 µm. The method 300 can also include a step of setting a step height of the ridges relative to the grooves to control an optical path difference between adjacent ridges and grooves. As mentioned above, the step height can be selected to provide a predetermined optical path difference between the ridges and the grooves. In some implementations, the diffraction grating can be provided with a duty cycle of about 50% and the diffraction grating assembly can be positioned over the pixel array such that each ridge and each groove extends over and in alignment with a corresponding one of the light-sensitive pixels, or alternatively such that each transition or junction between adjacent ridges and grooves extends over and in alignment with a corresponding one of the light-sensitive pixels.

Referring still to FIG. 19, the method 300 also includes a step 304 of receiving and diffracting an optical wavefront originating from the scene with the diffraction grating to generate a diffracted wavefront, and a step 306 of detecting the diffracted wavefront with the light-sensitive pixels. In color imaging applications, the method 300 can include an optional step 308 of spatio-spectrally filtering the diffracted wavefront with a color filter array prior to the detecting step 306. In some implementations, the method 300 can further include an optional step of spectrally dispersing the optical wavefront prior to diffracting the optical wavefront.

Of course, numerous modifications could be made to the embodiments described above without departing from the scope of the present description.

The invention claimed is:

1. A method of imaging a scene, the method comprising:
diffracting an optical wavefront originating from the scene with a diffraction grating having a grating period along a grating axis to generate a diffracted wavefront, the diffracted wavefront having, in a near-field diffraction region, an intensity profile that is spatially modulated according to the grating period and that shifts laterally along the grating axis upon varying an angle of incidence of the optical wavefront;
detecting the diffracted wavefront with a pixel array comprising a plurality of light-sensitive pixels disposed under the diffraction grating in the near-field diffraction region, wherein said detecting comprises sampling different spatial parts of the intensity profile of the diffracted wavefront with first and second adjacent pixel groups of the plurality of light-sensitive pixels and generating therefrom respective first and second pixel responses that vary differently with the angle of incidence of the optical wavefront;
computing a difference between the first and second pixel responses, wherein the computing comprises subtracting the first pixel responses from the second pixel responses to obtain angle-modulated pixel responses; and determining depth information about the scene from the angle-modulated pixel responses.

2. The method of claim 1, further comprising providing the diffraction grating as a phase grating comprising a series of ridges periodically spaced-apart at the grating period and a series of grooves periodically spaced-apart at the grating period and interleaved with the series of ridges.

3. The method of claim 2, further comprising providing the diffraction grating with a duty cycle of about 50%, wherein the duty cycle is defined as a ratio of a width of one of the ridges to the grating period.

4. The method of claim 2, wherein providing the diffraction grating comprises varying a degree of vertical alignment between the ridges and the grooves and the underlying light-sensitive pixels as a function of position within the pixel array.

5. The method of claim 1, further comprising providing the diffraction grating as one of a plurality of diffraction gratings disposed over the pixel array, the plurality of diffraction gratings comprising two sets of diffraction gratings have mutually orthogonal grating orientations.

6. The method of claim 1, further comprising setting the grating period to be larger than a pixel pitch of the pixel array along the grating axis.

7. The method of claim 6, further comprising setting a ratio of the grating period to the pixel pitch along the grating axis to be substantially equal to two.

8. The method of claim 1, further comprising filtering the diffracted wavefront with a color filter array interposed between the diffracting grating and the pixel array prior to detecting the diffracted wavefront.

9. The method of claim 8, wherein the color filter array is a Bayer pattern, an RGB-IR pattern, an RGB-W pattern, or a CYYM pattern.

10. The method of claim 1, further comprising:
computing a sum of the first and second pixel responses; and
determining two-dimensional image information about the scene from the computed sum.

* * * * *